United States Patent
Ibrahim et al.

(10) Patent No.: US 12,489,572 B2
(45) Date of Patent: Dec. 2, 2025

(54) TRACKING REFERENCE SIGNALS IN FULL DUPLEX OPERATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 17/956,588

(22) Filed: Sep. 29, 2022

(65) Prior Publication Data

US 2024/0113833 A1    Apr. 4, 2024

(51) Int. Cl.
*H04L 5/00* (2006.01)
*H04L 5/14* (2006.01)
(Continued)

(52) U.S. Cl.
CPC ....... *H04L 5/0048* (2013.01); *H04W 72/0446* (2013.01); *H04W 72/0453* (2013.01); *H04W 72/23* (2023.01)

(58) Field of Classification Search
CPC .......... H04L 5/0048; H04W 72/0453; H04W 72/23; H04W 72/231; H04W 72/232; H04W 72/0446
See application file for complete search history.

(56) References Cited

U.S. PATENT DOCUMENTS

2023/0422165 A1* 12/2023 Sun ................ H04L 5/001
2024/0275450 A1*  8/2024 Mu ................. H04L 5/001

FOREIGN PATENT DOCUMENTS

WO   WO-2019032844 A1 *  2/2019  .......... H04L 5/0053
WO   WO-2024010586 A1 *  1/2024  .......... H04L 5/0007
WO   WO-2024018604 A1 *  1/2024  .......... H04W 72/20

OTHER PUBLICATIONS

ERICSSON: "Sub-band Non-Overlapping Full Duplex", 3GPP TSG-RAN WG1 Meeting #109-e, R1-2204107, 3rd Generation Partnership Project, Mobile Competence Centre, 650, Route Des Lucioles, F-06921 Sophia-Antipolis Cedex, FRANCE, vol. RAN WG1, No. e-Meeting, May 9, 2022-May 20, 2022, Apr. 29, 2022, 10 Pages, XP052143999, Section 3, Figure 3, Sec. 4.2.2, Sec. 3.2.
(Continued)

Primary Examiner — Kevin C. Harper
(74) Attorney, Agent, or Firm — Holland & Hart LLP

(57) ABSTRACT

Methods, systems, and devices for wireless communications are described. Techniques described herein relate to schemes for managing an overlap of at least part of a tracking reference signal (TRS) with an uplink subband or a guard band in a subband full duplex (SBFD) slot or symbol. In some examples, if a user equipment (UE) and/or a network entity determines that at least a portion of a TRS is scheduled for reception in an uplink subband or a guard band of an SBFD slot or symbol, the UE and/or the network entity may: drop the TRS, puncture the portion of the TRS that overlaps with the uplink subband or the guard band; or may shift the frequency position of the TRS such that the TRS is scheduled within the downlink subband(s) of the SBFD slot or symbol.

22 Claims, 21 Drawing Sheets

(51) Int. Cl.
*H04W 72/0446* (2023.01)
*H04W 72/0453* (2023.01)
*H04W 72/23* (2023.01)

(56) References Cited

OTHER PUBLICATIONS

International Search Report and Written Opinion—PCT/US2023/073350—ISA/EPO—Dec. 4, 2023.
Qualcomm Incorporated: "Feasibility and Techniques for Subband Non-Overlapping Full Duplex", 3GPP TSG RAN WG1, Meeting #110, R1-2207231, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 13, 2022, pp. 1-28, XP052275167, Sections 1-5, p. 7, Paragraph 2.5.2, p. 9, Section 3.1.2, Figures 3-2, The Whole Document.
Wilus Inc: "Discussion On Subband Non-overlapping Full Duplex", 3GPP TSG RAN WG1 #110, R1-2207598, 3rd Generation Partnership Project (3GPP), Mobile Competence Centre, 650, Route Des Lucioles, F-06921 Sophia-antipolis Cedex, France, vol. RAN WG1, No. Toulouse, France, Aug. 22, 2022-Aug. 26, 2022, Aug. 12, 2022, XP052275533, 5 Pages, p. 4-p. 5.

\* cited by examiner

TRACKING REFERENCE SIGNALS IN FULL DUPLEX OPERATION

FIELD OF TECHNOLOGY

The following relates to wireless communications, including employing tracking reference signals in full duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support tracking reference signals (TRSs) in full duplex operation. For example, the described techniques provide for managing an overlap of at least part of a TRS with an uplink subband or a guard band in a subband full duplex (SBFD) slot or symbol. If a user equipment (UE) and/or a network entity determines that a portion of a TRS is scheduled for reception in an uplink subband or a guard band of an SBFD slot or symbol, the UE and/or the network entity may drop the TRS, puncture the portion of the TRS that overlaps with the uplink subband or the guard band, or shift the frequency position of the TRS such that the TRS is scheduled within the downlink subband(s) of the SBFD slot or symbol.

A method for wireless communications at a UE is described. The method may include receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjusting monitoring for the TRS based on the portion of the TRS overlapping with at least one of the guard band or the uplink subband.

An apparatus for wireless communications at a UE is described. The apparatus may include a processor, memory coupled with the processor, and instructions stored in the memory. The instructions may be executable by the processor to cause the apparatus to receive, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjust monitoring for the TRS based on the portion of the TRS overlapping with at least one of the guard band or the uplink subband.

Another apparatus for wireless communications at a UE is described. The apparatus may include means for receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and means for adjusting monitoring for the TRS based on the portion of the TRS overlapping with at least one of the guard band or the uplink subband.

A non-transitory computer-readable medium storing code for wireless communications at a UE is described. The code may include instructions executable by a processor to receive, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjust monitoring for the TRS based on the portion of the TRS overlapping with at least one of the guard band or the uplink subband.

Some examples of the method, apparatuses, and non-transitory computer-readable medium described herein may further include operations, features, means, or instructions for suppressing monitoring for the TRS based on the portion of the TRS overlapping with at least one of the guard band or the uplink subband.

Some examples of the method, apparatuses, and non-transitory computer-readable medium described herein may further include operations, features, means, or instructions for suppressing monitoring for the portion of the TRS and receiving the TRS via a second portion of the TRS that overlaps with the downlink subband.

In some examples of the method, apparatuses, and non-transitory computer-readable medium described herein, receiving the TRS via the second portion may include operations, features, means, or instructions for receiving the TRS based on the second portion satisfying a threshold bandwidth.

Some examples of the method, apparatuses, and non-transitory computer-readable medium described herein may further include operations, features, means, or instructions for receiving the TRS via a third portion of the TRS that overlaps with a second downlink subband of the slot, where the second downlink subband may be non-contiguous in frequency with the downlink subband.

In some examples of the method, apparatuses, and non-transitory computer-readable medium described herein, receiving the TRS via the second portion and the third portion may include operations, features, means, or instructions for receiving the TRS based on the second portion and the third portion satisfying a cumulative threshold bandwidth.

In some examples of the method, apparatuses, and non-transitory computer-readable medium described herein, receiving the TRS via the second portion and the third portion may include operations, features, means, or instructions for receiving the TRS based on the second portion and the third portion each satisfying a threshold bandwidth.

Some examples of the method, apparatuses, and non-transitory computer-readable medium described herein may further include operations, features, means, or instructions for suppressing monitoring for a third portion of the TRS that overlaps with a second downlink subband of the slot, where the second downlink subband may be non-contiguous in frequency with the downlink subband.

In some examples of the method, apparatuses, and non-transitory computer-readable medium described herein, suppressing monitoring for the third portion may include operations, features, means, or instructions for suppressing monitoring for the third portion based on the second portion including more TRS resources than the third portion.

In some examples of the method, apparatuses, and non-transitory computer-readable medium described herein, suppressing monitoring for the third portion may include operations, features, means, or instructions for suppressing monitoring for the third portion based on the third portion failing to satisfy a threshold bandwidth.

In some examples of the method, apparatuses, and non-transitory computer-readable medium described herein, adjusting monitoring for the TRS may include operations, features, means, or instructions for shifting monitored resources for the TRS in frequency such that the monitored resources for the TRS may be within the downlink subband.

Some examples of the method, apparatuses, and non-transitory computer-readable medium described herein may further include operations, features, means, or instructions for receiving a second TRS of the scheduled set of TRSs in a half duplex symbol of the slot, where the TRS may be scheduled in an SBFD symbol of the slot.

In some examples of the method, apparatuses, and non-transitory computer-readable medium described herein, the slot includes an SBFD slot.

In some examples of the method, apparatuses, and non-transitory computer-readable medium described herein, receiving the control signaling may include operations, features, means, or instructions for receiving an indication of a frequency hopping pattern to apply to TRSs in SBFD slots and half duplex slots, where adjusting monitoring for the TRS includes applying the frequency hopping pattern to the TRS such that the TRS may be within the downlink subband based on the slot being an SBFD slot.

A method for wireless communications at a network entity is described. The method may include transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjusting transmission of the TRS based on the portion of the TRS overlapping with at least one of the guard band or the uplink subband.

An apparatus for wireless communications at a network entity is described. The apparatus may include a processor, memory coupled with the processor, and instructions stored in the memory. The instructions may be executable by the processor to cause the apparatus to transmit, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjust transmission of the TRS based on the portion of the TRS overlapping with at least one of the guard band or the uplink subband.

Another apparatus for wireless communications at a network entity is described. The apparatus may include means for transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and means for adjusting transmission of the TRS based on the portion of the TRS overlapping with at least one of the guard band or the uplink subband.

A non-transitory computer-readable medium storing code for wireless communications at a network entity is described. The code may include instructions executable by a processor to transmit, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband and adjust transmission of the TRS based on the portion of the TRS overlapping with at least one of the guard band or the uplink subband.

Some examples of the method, apparatuses, and non-transitory computer-readable medium described herein may further include operations, features, means, or instructions for suppressing transmission of the TRS based on the portion of the TRS overlapping with at least one of the guard band or the uplink subband.

Some examples of the method, apparatuses, and non-transitory computer-readable medium described herein may further include operations, features, means, or instructions for suppressing transmission of the portion of the TRS and transmitting the TRS via a second portion of the TRS that overlaps with the downlink subband.

In some examples of the method, apparatuses, and non-transitory computer-readable medium described herein, transmitting the TRS via the second portion may include operations, features, means, or instructions for transmitting the TRS based on the second portion satisfying a threshold bandwidth.

Some examples of the method, apparatuses, and non-transitory computer-readable medium described herein may further include operations, features, means, or instructions for transmitting the TRS via a third portion of the TRS that overlaps with a second downlink subband of the slot, where the second downlink subband may be non-contiguous in frequency with the downlink subband.

In some examples of the method, apparatuses, and non-transitory computer-readable medium described herein, transmitting the TRS via the second portion and the third portion may include operations, features, means, or instructions for transmitting the TRS based on the second portion and the third portion satisfying a cumulative threshold bandwidth.

In some examples of the method, apparatuses, and non-transitory computer-readable medium described herein, transmitting the TRS via the second portion and the third portion may include operations, features, means, or instructions for transmitting the TRS based on the second portion and the third portion each satisfying a threshold bandwidth.

Some examples of the method, apparatuses, and non-transitory computer-readable medium described herein may further include operations, features, means, or instructions for suppressing transmission of a third portion of the TRS that overlaps with a second downlink subband of the slot, where the second downlink subband may be non-contiguous in frequency with the downlink subband.

In some examples of the method, apparatuses, and non-transitory computer-readable medium described herein, suppressing transmission of the third portion may include operations, features, means, or instructions for suppressing transmission of the third portion based on the second portion including more TRS resources than the third portion.

In some examples of the method, apparatuses, and non-transitory computer-readable medium described herein, suppressing transmission of the third portion may include operations, features, means, or instructions for suppressing transmission of the third portion based on the third portion failing to satisfy a threshold bandwidth.

In some examples of the method, apparatuses, and non-transitory computer-readable medium described herein, adjusting transmission of the TRS may include operations, features, means, or instructions for shifting the TRS in frequency such that the TRS may be within the downlink subband.

Some examples of the method, apparatuses, and non-transitory computer-readable medium described herein may further include operations, features, means, or instructions for transmitting a second TRS of the scheduled set of TRSs in a half duplex symbol of the slot, where the TRS may be scheduled in an SBFD symbol of the slot.

In some examples of the method, apparatuses, and non-transitory computer-readable medium described herein, the slot includes an SBFD slot.

In some examples of the method, apparatuses, and non-transitory computer-readable medium described herein, transmitting the control signaling may include operations, features, means, or instructions for transmitting an indication of a frequency hopping pattern to apply to TRSs in SBFD slots and half duplex slots, where adjusting transmission of the TRS includes applying the frequency hopping pattern to the TRS such that the TRS may be within the downlink subband based on the slot being an SBFD slot.

DETAILED DESCRIPTION

Figure 1:
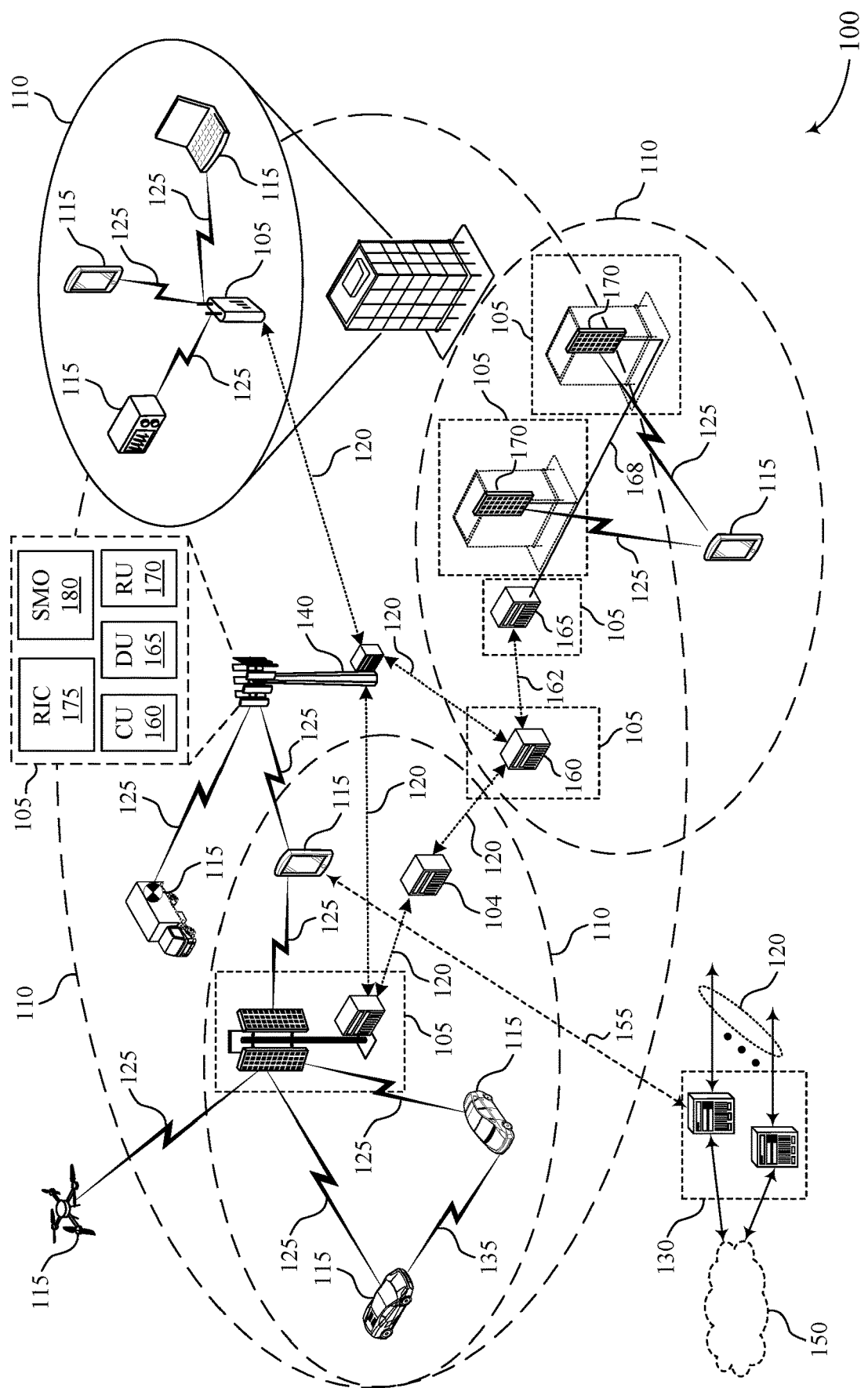
FIG. 1 illustrates an example of a wireless communications system that supports tracking reference signals in full duplex operation in accordance with one or more aspects of the present disclosure.

Some wireless communications systems may implement subband full duplex (SBFD) communications. In SBFD communications, a user equipment (UE) and network entity may communicate uplink transmissions and downlink transmissions simultaneously. For example, an SBFD slot may include at least one uplink subband, at least one downlink subband, and a guard band separating the at least one uplink subband from the at least one downlink subband. The network entity may schedule semi-static or periodic tracking reference signals (TRSs) for transmission to the UE, which the UE may use for time or frequency tracking and/or estimation of delay or Doppler spread. In some cases, the UE and the network entity may switch between half duplex communications and SBFD communications. In an SBFD slot or symbol, at least a portion of a semi-statically or periodically scheduled TRS may be scheduled in the uplink subband or the guard band. The UE may not receive signals in the uplink subband or in the guard band. Accordingly, the UE may be unable to receive a TRS that at least partially overlaps with the uplink subband or the guard band.

Aspects of the present disclosure relate to managing TRS transmission and reception in full duplex operation. For example, some aspects relate to schemes for managing an overlap of at least part of a TRS with an uplink subband or a guard band in an SBFD slot or symbol. If a UE and/or the network entity determines that a portion of a TRS is scheduled for reception in an uplink subband or a guard band of an SBFD slot or symbol, the UE and/or the network entity may drop the TRS, may puncture the portion of the TRS that overlaps with the uplink subband or a guard band, or may shift the frequency position of the TRS such that the TRS is scheduled within the downlink subband(s) of the SBFD slot or symbol. Puncturing may refer to dropping the portion(s) of the TRS that overlaps with the uplink subband or a guard band and receiving the TRS via the remaining portion(s) of the TRS that are included within the downlink subband(s). For example, when puncturing a portion of TRS, a UE may omit monitoring for the TRS in the communications resources that are punctured, and a network entity may refrain from transmitting the TRS in the communications resources that are punctured. In some examples, the UE and the network entity may determine whether to puncture or drop a TRS based on a bandwidth of the TRS that is within the downlink subband(s). In some cases, the network may define a frequency hopping scheme for half duplex slots or symbols and SBFD or symbols such that TRSs are scheduled for reception in the downlink resources for a given slot/symbol whether the slot/symbol is configured for half duplex communications or SBFD communications.

Aspects of the disclosure are initially described in the context of wireless communications systems. Aspects of the disclosure are additionally illustrated by and described with reference to resource diagrams, timing diagrams, slot formats and process flows. Aspects of the disclosure are further illustrated by and described with reference to apparatus diagrams, system diagrams, and flowcharts that relate to TRS in full duplex operation.

FIG. 1 illustrates an example of a wireless communications system 100 that supports TRSs in full duplex operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support TRS in full duplex operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may implement SBFD communications. In SBFD communications, a UE 115 and a network entity 105 may communicate uplink transmissions and downlink transmissions simultaneously. For example, an SBFD slot may include at least one uplink subband, at least one downlink subband (e.g., within the same carrier as the at least one uplink subband), and a guard band separating the at least one uplink subband from the at least one downlink subband. The network entity 105 may schedule semi-static or periodic TRSs for transmission to the UE 115, which the UE 115 may use, for example, for time or frequency tracking and estimation of delay or Doppler spread. In some cases, the UE 115 and the network entity 105 may switch between half duplex communications and SBFD communications. In an SBFD slot or symbol, at least a portion of a semi-statically or periodically scheduled TRS may be scheduled in the uplink subband or the guard band. The UE 115 may not receive signals in the uplink subband or in the guard band. Accordingly, the UE 115 may be unable to receive a TRS that at least partially overlaps with the uplink subband or the guard band.

If a UE 115 and/or the network entity 105 determines that a portion of a TRS is scheduled for reception in an uplink subband or a guard band of an SBFD slot or symbol, the UE 115 and/or the network entity 105 may drop the TRS, may puncture the portion of the TRS that overlaps with the uplink subband or a guard band, or may shift the frequency position of the TRS such that the TRS is scheduled within the downlink subband(s) of the SBFD slot or symbol. Puncturing refers to dropping the portion of the TRS that overlaps with the uplink subband or a guard band and receiving the TRS via the remaining portion(s) of the TRS that are included within the downlink subband(s). In some examples, the UE 115 and the network entity 105 may determine whether to puncture or drop a TRS based on a bandwidth of the TRS that is within the downlink subband(s). In some cases, the network entity 105 may define a frequency hopping scheme for half duplex slots or symbols and SBFD or symbols such that TRSs are scheduled for reception in the downlink resources for a given slot/symbol whether the slot/symbol is configured for half duplex communications or SBFD communications.

Figure 2:
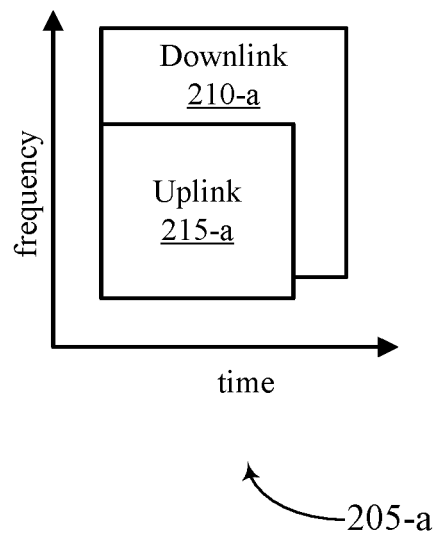
FIG. 2 illustrates an example of a resource diagram that supports tracking reference signals in full duplex operation in accordance with one or more aspects of the present disclosure.
Figure 2:
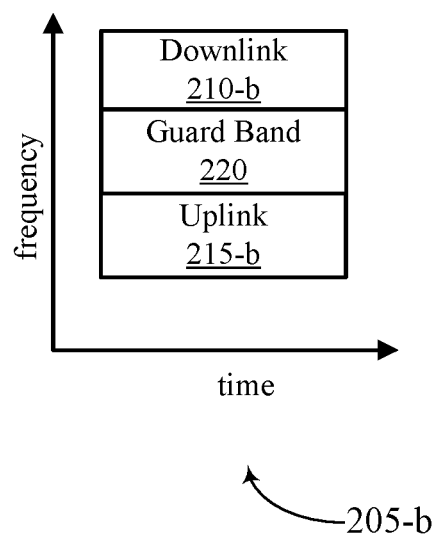

FIG. 2 illustrates an example of a resource diagram 200 that supports TRSs in a full duplex network in accordance with one or more aspects of the present disclosure. The resource diagram 200 may implement aspects of the wireless communications system 100. As described herein, some wireless communications systems 100 may implement full duplex communications. Full duplex communications may be in-band full duplex (IBFD) communications or subband FDD communications (e.g., flexible duplex).

A first example 205-a illustrates an IBFD example. In IBFD, a wireless device (e.g., a network entity 105 or a UE 115) may transmit and receive at the same time on the same frequency resource. For example, a downlink resources 210-a and uplink resources 215-a may fully or partially overlap (e.g., the downlink resources 210-a and the uplink resources 215-a may share same IBFD time and/or frequency resources).

A second example 205-b illustrates a subband FDD example. In subband FDD a wireless device (e.g., a network entity 105 or a UE 115) may transmit and receive at the same time but on different frequency resources. For example, the downlink resources 210-b may be separated from the uplink resources 215-b in the frequency domain (e.g., via a guard band 220).

Figure 3:
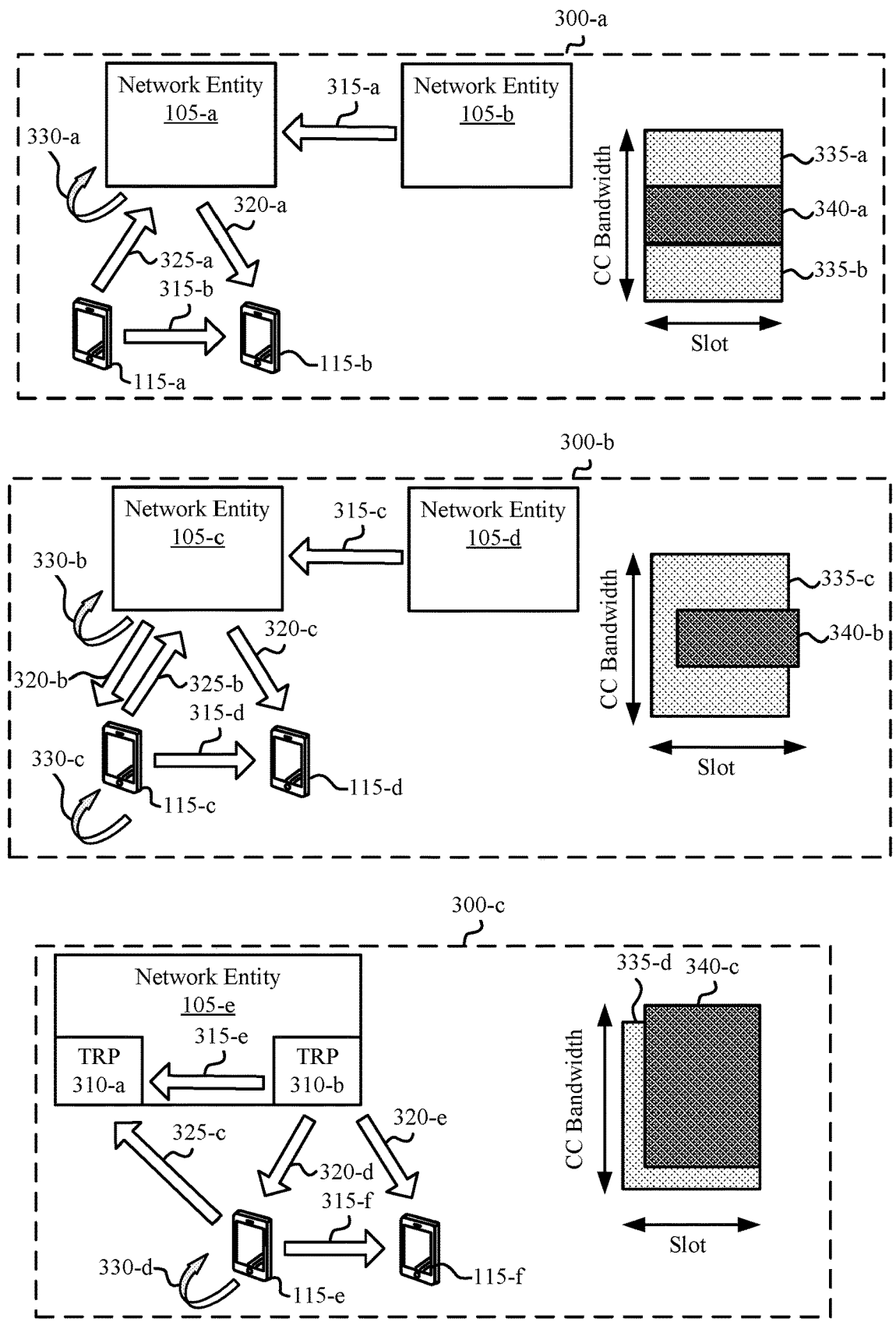
FIG. 3 illustrates examples of wireless communications systems that supports tracking reference signals in full duplex operation in accordance with one or more aspects of the present disclosure.

FIG. 3 illustrates an example of a wireless communications system 300-a, a wireless communications system 300-b, and a wireless communications system 300-c that support TRSs in a full duplex network in accordance with one or more aspects of the present disclosure. The wireless communications system 300-a, the wireless communications system 300-b, and the wireless communications system 300-c may implement aspects of the wireless communications system 100. For example, the wireless communications system 300-a may include a first UE 115-a and a second UE 115-b, the wireless communications system 300-b may include a first UE 115-c and a second UE 115-d, and the wireless communications system 300-c may include a first UE 115-e and a second UE 115-f, which may be examples of a UE 115 as described herein. The wireless communications system 300-a may include a network entity 105-a and a network entity 105-b, the wireless communications system 300-b may include a network entity 105-c and a network entity 105-d, and the wireless communications system 300-c may include a network entity 105-e which may be examples of a network entity 105 as described herein.

The wireless communications system 300-a illustrates an example where the network entity 105-a operates in full duplex and each of the first UE 115-a and the second UE 115-b operates in half duplex. For example, the network entity 105-a may transmit downlink signals 320-a to the second UE 115-b using downlink resources (e.g., downlink resources 335-a or downlink resources 335-b), and the first UE 115-a may transmit uplink signals 325-a to the network entity 105-a using uplink resources 340-a. The uplink resources 340-a may be non-overlapping with the downlink resources 335-a and the downlink resources 335-b. The uplink signals 325-a transmitted by the first UE 115-a may cause cross-link interference 315-b at the second UE 115-b. Transmissions by the network entity 105-b may cause cross-link interference 315-a at the network entity 105-a. Transmissions of the downlink signals 320-a by the network entity 105-*a* may cause self-interference 330-*a* at the network entity 105-*a* with respect to reception of the uplink signals 325-*a*.

The wireless communications system 300-*b* illustrates an example where the network entity 105-*c* operates in full duplex and the first UE 115-*c* operates in full duplex. For example, the network entity 105-*c* may transmit downlink signals 320-*b* to the first UE 115-*c* using downlink resources 335-*c*, and the first UE 115-*c* may transmit uplink signals 325-*b* to the network entity 105-*c* using uplink resources 340-*b*. The network entity 105-*c* may also transmit downlink signals 320-*c* to the second UE 115-*d*. The uplink resources 340-*b* may be overlapping with (e.g., partially or fully overlapping with) the downlink resources 335-*c*. The uplink signals 325-*b* transmitted by the first UE 115-*c* may cause cross-link interference 315-*d* at the second UE 115-*d*. Transmissions by the network entity 105-*d* may cause cross-link interference 315-*c* at the network entity 105-*c*. Transmissions of the downlink signals 320-*b* or the downlink signals 320-*c* by the network entity 105-*c* may cause self-interference 330-*b* at the network entity 105-*a* with respect to reception of the uplink signals 325-*b*. Transmissions of the uplink signals 325-*b* by the first UE 115-*c* may cause self-interference 330-*c* at the first UE 115-*c* with respect to reception of the downlink signals 320-*b*.

The wireless communications system 300-*c* illustrates an example where the network entity includes multiple TRPs (e.g., a first TRP 310-*a* and a second TRP 310-*b*) and operates in full duplex, and the first UE 115-*e* operates in full duplex. For example, the first UE 115-*e* may support SBFD operation. For example, the second TRP 310-*b* may transmit downlink signals 320-*d* to the first UE 115-*e* using downlink resources 335-*d* and the second TRP 310-*b* may transmit downlink signals 320-*e* to the second UE 115-*f* using the downlink resources 335-*d*. The first UE 115-*e* may transmit uplink signals 325-*c* to the first TRP 310-*a* using uplink resources 340-*c*. The uplink resources 340-*c* may be overlapping with (e.g., partially or fully overlapping with) the downlink resources 335-*d*. Transmissions by the second TRP 310-*b* of the downlink signals 320-*d* and the downlink signals 320-*e* may cause cross-link interference 315-*e* at the first TRP 310-*a*. The uplink signals 325-*c* transmitted by the first UE 115-*e* may cause cross-link interference 315-*f* at the second UE 115-*f* Transmissions of the uplink signals 325-*c* by the first UE 115-*e* may cause self-interference 330-*d* at the first UE 115-*e* with respect to reception of the downlink signals 320-*d*.

Some wireless communications systems may include TDD bands only. Some wireless communications systems (e.g., the wireless communications system 300-*a*), may include full duplex operation at the network and half duplex operation at the UE. Some wireless communications systems may support SBFD (e.g., full duplex within a carrier but no overlapping between downlink and uplink frequency resources).

Figure 4:
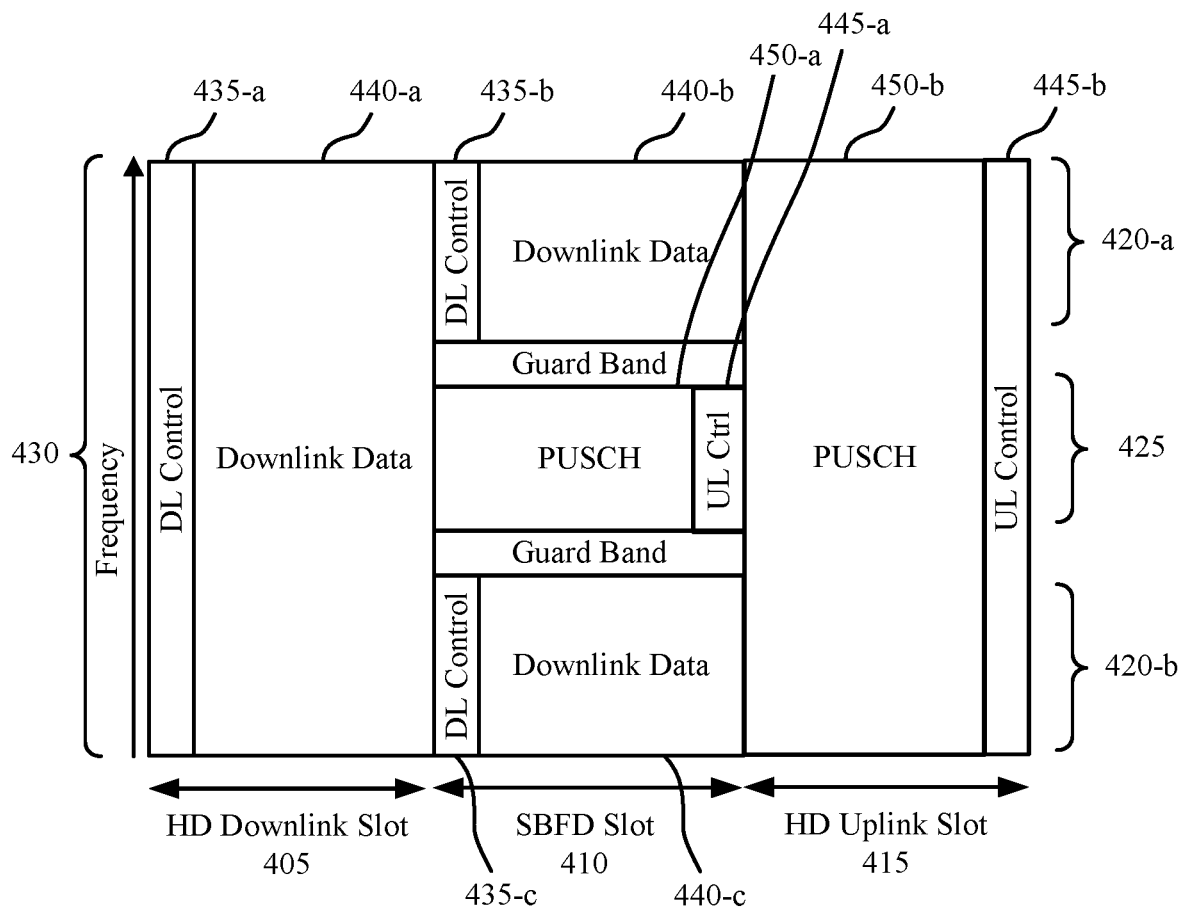
FIG. 4 illustrates an example of a slot format that supports tracking reference signals in full duplex operation in accordance with one or more aspects of the present disclosure.

FIG. 4 illustrates an example of a slot format 400 that supports TRSs in a full duplex network in accordance with one or more aspects of the present disclosure. The slot format 400 may implement aspects of the wireless communications system 100, the wireless communications system 300-*a*, the wireless communications system 300-*b*, or the wireless communications system 300-*c*.

The slot format 400 illustrates an example half duplex downlink slot 405, an SBFD slot 410, and a half duplex uplink slot 415 for a carrier bandwidth 430. The half duplex downlink slot 405 includes a downlink control region 435-*a* (e.g., resources for downlink control) and a downlink data region 440-*a* (e.g., resources for downlink data). The half duplex uplink slot 415 includes an uplink data region 450-*b* (e.g., resources for physical uplink shared channel (PUSCH)) and an uplink control region 445-*b* (e.g., resources for uplink control).

The SBFD slot 410 includes a downlink BWP including a first downlink subband 420-*a* and a second downlink subband 420-*b*. In a 'D+U' slot, as in SBFD slot 410, the carrier bandwidth 430 may be used for both uplink and downlink transmissions. As illustrated in FIG. 4, the SBFD slot 410 includes an uplink BWP including an uplink subband 425. Guard bands may separate the first downlink subband 420-*a* and the second downlink subband 420-*b* from the uplink subband 425. The first downlink subband 420-*a* includes a downlink control region 435-*b* and a downlink data region 440-*b*. The second downlink subband 420-*b* includes a downlink control region 435-*c* and a downlink data region 440-*c*. The uplink subband 425 includes a PUSCH region 450-*a* and an uplink control region 445-*a*. In some examples, in a 'D+U' slot, downlink and uplink transmissions may occur in overlapping frequency bands (e.g., IBFD operation). In some examples, in a 'D+U' slot, as shown in SBFD slot 410, downlink and uplink transmissions may occur in adjacent, non-overlapping bands. If scheduled with a 'D+U' slot, a half duplex UE 115 may either transmit in the uplink band (e.g., the uplink subband 425) or receive in the downlink band (e.g., the first downlink subband 420-*a* and the second downlink subband 420-*b*). If scheduled with a 'D+U' slot, a full duplex UE 115 (e.g., a UE 115 that supports simultaneous transmission and reception) may transmit in the uplink band (e.g., the uplink subband 425) and/or receive in the downlink band (e.g., the first downlink subband 420-*a* and the second downlink subband 420-*b*). A 'D+U' slot may include downlink only symbols, uplink only symbols, or full duplex symbols.

Figure 5:
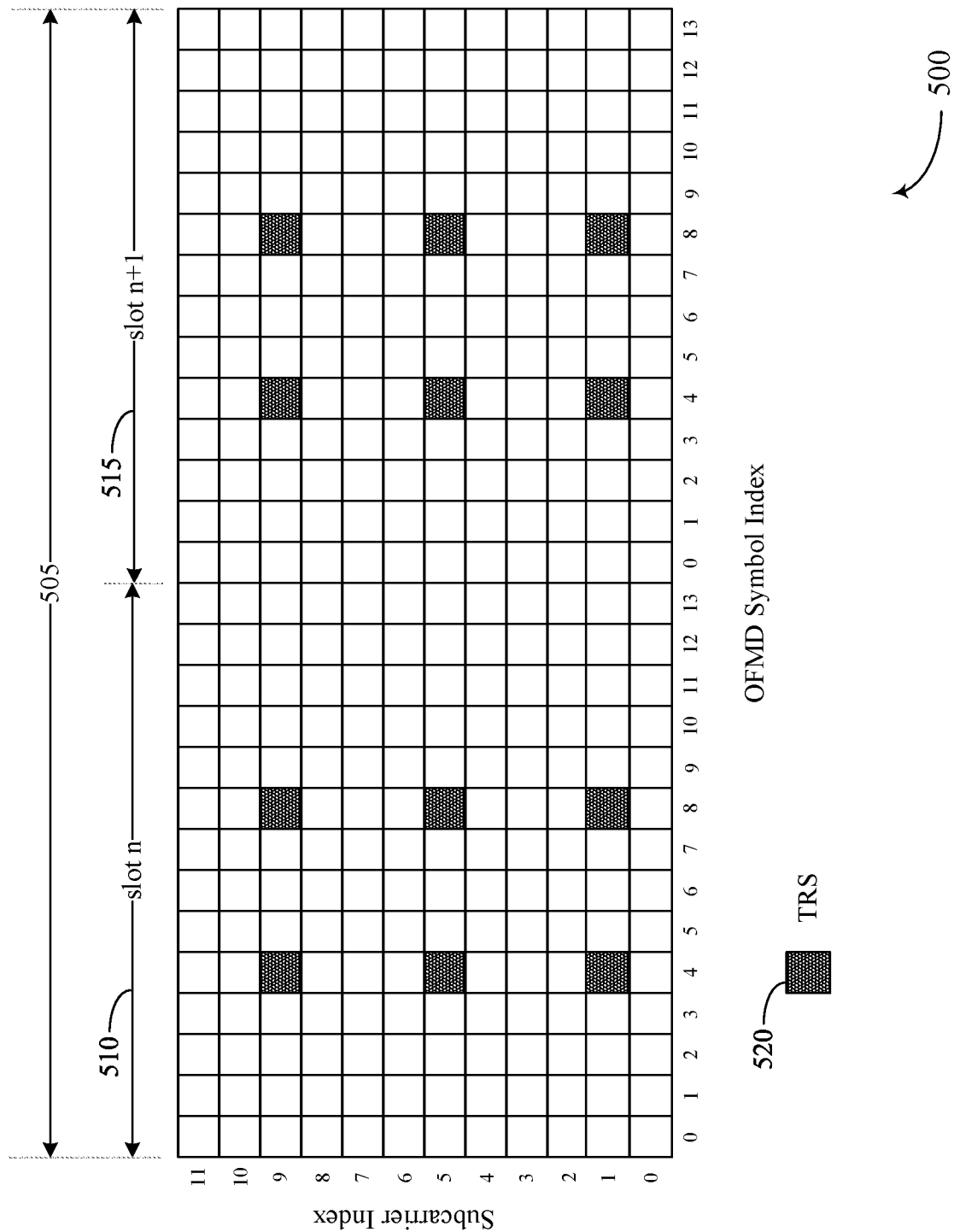
FIG. 5 illustrates an example of a timing diagram that supports tracking reference signals in full duplex operation in accordance with one or more aspects of the present disclosure.

FIG. 5 illustrates an example of timing diagram 500 that supports TRSs in a full duplex network in accordance with one or more aspects of the present disclosure. In some examples, timing diagram 500 may implement aspects of the wireless communication system 100, the wireless communications system 300-*a*, the wireless communications system 300-*b*, or the wireless communications system 300-*c*. In the example of FIG. 5, a time period 505 corresponding to a first slot 510 and a second slot 515 is illustrated. In this example, a TRS resources 520 may be configured in the first slot 510 and the second slot 515 (indexed as slot n and slot n+1, respectively).

In some examples, the TRS resources 520 may contain two or four periodic CSI-RS resources with periodicity $P*2^\mu$ slots, where P=10, 20, 40, or 80 and µ represents a subcarrier spacing (SCS) (e.g., 11=0, 1, . . . for 15, 30, . . . ). All four resources (e.g., the TRS resources in the fourth indexed symbol in the first slot 510, the TRS resources in the eighth indexed symbol in the first slot 510, the TRS resources in the second slot 515, and the TRS resources in the eighth indexed symbol in the second slot 515) may be associated with a single port with a density of three (e.g., a TRS of the TRS resources 520 is transmitted using three resource elements per symbol per resource block and using one antenna port). A first pair of TRS resources of the TRS resources 520 may be transmitted in one slot (e.g., the first slot 510), and a second pair of resources of the TRS resources 520 (if configured) may be transmitted in the next adjacent slot (e.g., the second slot 515). The minimum bandwidth may be equal to min{52 physical resource blocks (PRBs), bandwidth of the active BWP}. In some examples, for P=10, the bandwidth may not exceed 52 PRBs. In the example of FIG. 5, the TRS resources 520 contain two pair of resources in the first slot 510 using three resource elements per symbol per resource block and two pair of resources in the second slot 515 using three resource elements per symbol per resource block.

In some examples, the TRS resources 520 may be used for time/frequency tracking for a particular bandwidth or BWP and/or to measure a delay spread or a Doppler spread. To estimate the delay spread, the TRS resources 520 may have a dense pattern in frequency (e.g., D=3) and sufficient resource blocks. To estimate Doppler spread, each TRS of the TRS resources 520 may include two symbols with a separation of four symbols. In the example of FIG. 5, each TRS of the TRS resources 520 has a density of three and includes two symbols separated by 4 symbols.

Figure 6:
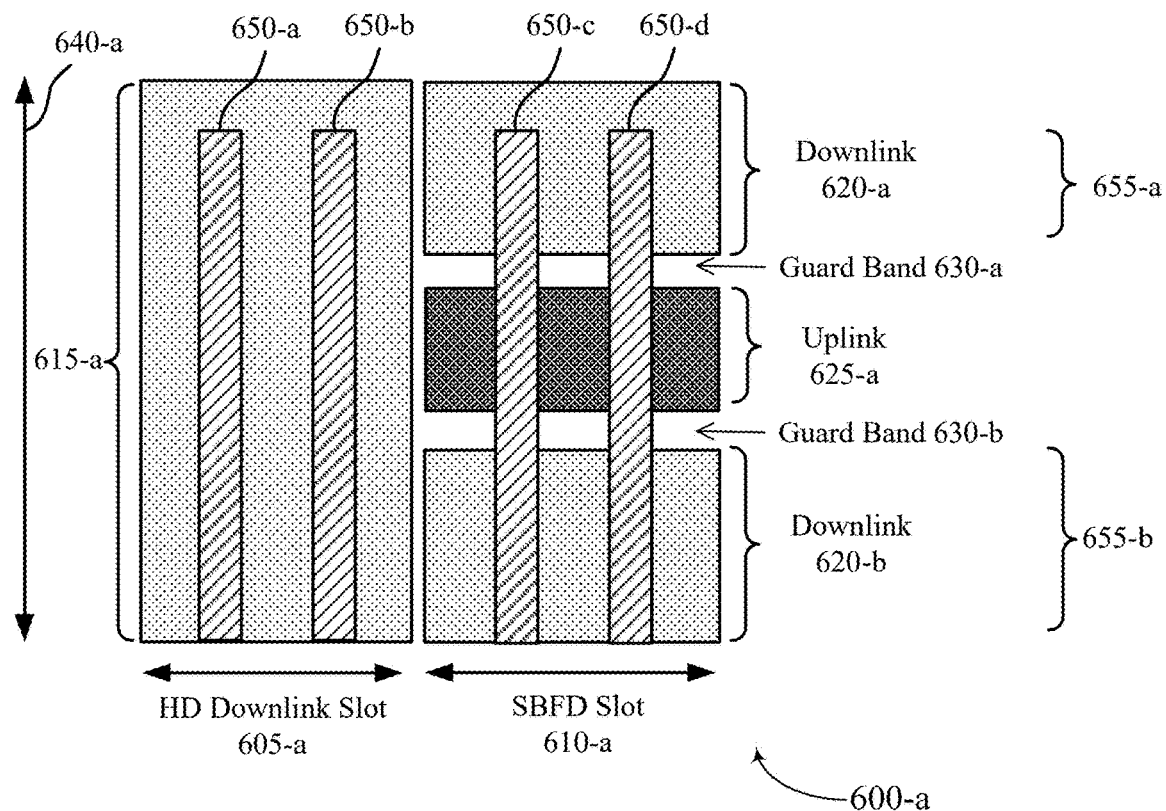
FIG. 6 illustrates an example of a resource diagram that supports tracking reference signals in full duplex operation in accordance with one or more aspects of the present disclosure.
Figure 6:
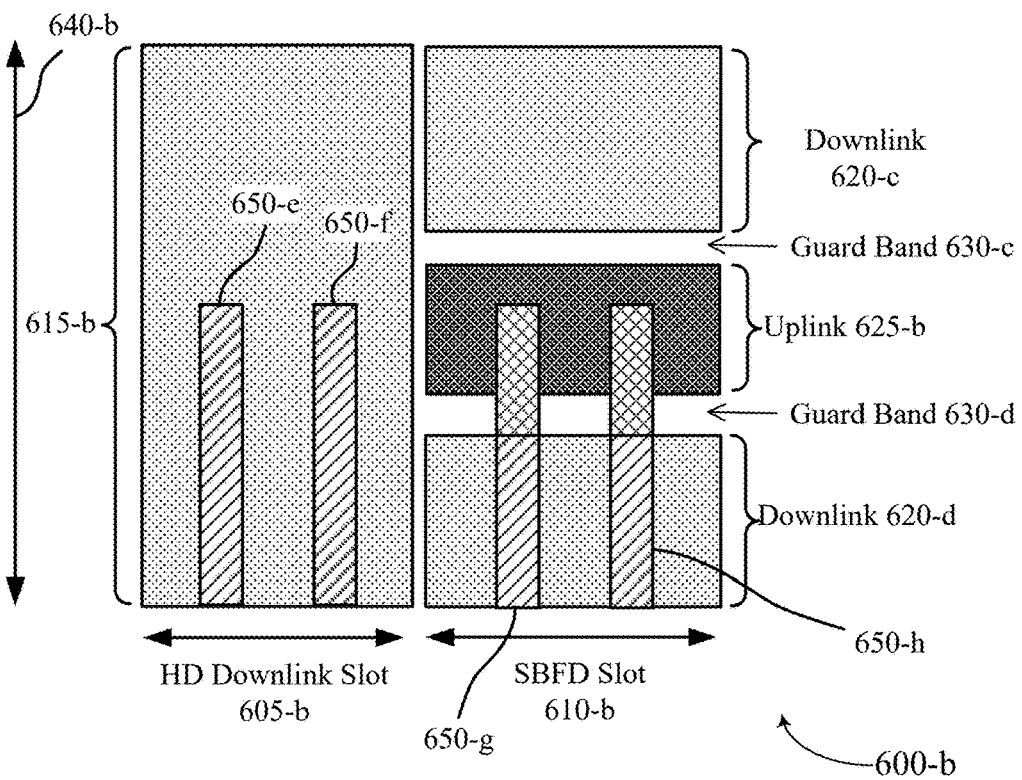

FIG. 6 illustrates an example of a slot format 600-*a* and an example of a slot format 600-*b* that support TRSs in full duplex operation in accordance with one or more aspects of the present disclosure. The slot formats 600-*a* and 600-*b* may implement aspects of the wireless communications system 100, the wireless communications system 300-*a*, the wireless communications system 300-*b*, or the wireless communications system 300-*c*.

The slot formats 600-*a* and 600-*b* illustrate an example half duplex downlink slot (e.g., half duplex downlink slot 605-*a* and half duplex downlink slot 605-*b*), and an SBFD slot (e.g., SBFD slot 610-*a* and SBFD slot 610-*b*) for an active BWP (e.g., BWP 640-*a* and BWP 640-*b*) for a UE 115. The half duplex downlink slot (half duplex downlink slot 605-*a* and half duplex downlink slot 605-*b*) includes a downlink region (downlink region 615-*a* and downlink region 615-*b*) (e.g., resources for downlink transmissions). The SBFD slot 610-*a* includes a downlink subband 620-*a* and a downlink subband 620-*b*. The SBFD slot 610-*b* includes a downlink subband 620-*c* and a downlink subband 620-*d*. In a 'D+U' slot, as in SBFD slots (e.g., SBFD slot 610-*a* and SBFD slot 610-*b*), the active BWP (e.g., BWP 640-*a* and BWP 640-*b*) may be used for both uplink and downlink transmissions.

As illustrated in the slot format 600-*a*, the SBFD slot 610-*a* includes an uplink subband 625-*a*. Guard band 630-*a* and guard band 630-*b* may separate the downlink subband 620-*a* and the downlink subband 620-*b* from the uplink subband 625-*a*. As illustrated in the slot format 600-*b*, the SBFD slot 610-*b* includes an uplink subband 625-*b*. Guard bands 630-*c* and 630-*d* may separate the downlink subband 620-*c* and the downlink subband 620-*d* from the uplink subband 625-*b*.

As shown in the slot format 600-*a*, in some examples, a UE 115 may be scheduled with TRS occasions in a half duplex downlink slot 605-*a* and an SBFD slot 610-*a*. A TRS 650-*a* and a TRS 650-*b* may be scheduled in the downlink region 615-*a* of the half duplex downlink slot 605-*a*, and the UE 115 may receive the TRS 650-*a* and the TRS 650-*b*. A TRS 650-*c* and a TRS 650-*d* may be scheduled in the SBFD slot 610-*a*. For example, the network may schedule periodic TRSs in each slot. In the SBFD slot 610-*a*, a first portion of the TRS 650-*c* and a first portion of the TRS 650-*d* overlaps with the downlink subband 620-*a*, a second portion of the TRS 650-*c* and a second portion of the TRS 650-*d* overlaps with the downlink subband 620-*b*, and a third portion of the TRS 650-*c* and a third portion of the TRS 650-*d* overlaps with the guard bands (guard band 630-*a* and guard band 630-*b*) and the uplink subband 625-*a*.

As shown in the slot format 600-*b*, in some examples, a UE 115 may be scheduled with TRS occasions in a half duplex downlink slot 605-*b* and an SBFD slot 610-*b*. A TRS 650-*e* and a TRS 650-*f* may be scheduled in the downlink region 615-*b* of the half duplex downlink slot 605-*b*, and the UE 115 may receive the TRS 650-*e* and the TRS 650-*f*. A TRS 650-*g* and a TRS 650-*g* may be scheduled in the SBFD slot 610-*b*. For example, the network may schedule periodic TRSs in each slot. In the SBFD slot 610-*b*, a first portion of the TRS 650-*g* and a first portion of the TRS 650-*h* overlaps with the downlink subband 620-*d*, and a second portion of the TRS 650-*g* and a second portion of the TRS 650-*h* overlaps with the guard bands 630-*d* and the uplink subband 625-*b*.

As shown in FIG. 6, in SBFD slots (e.g., SBFD slot 610-*a* and SBFD slot 610-*b*), the frequency domain resources available for downlink may be less than for half duplex downlink slots (e.g., half duplex downlink slot 605-*a* and half duplex downlink slot 605-*b*). For a full duplex aware UE, TRS occasions may occur in full duplex slots (e.g., SBFD slot 610-*a* and SBFD slot 610-*b*). In some cases, the TRSs that overlap with uplink subbands or guard bands in SBFD slots may be punctured. Puncturing may result in non-contiguous downlink resources (e.g., downlink subband 620-*a* and downlink subband 620-*b*) being used for a TRS (e.g., the TRS 650-*c* or the TRS 650-*d*), which may involve special handling at the UE side. In some cases, the UE 115 may process TRS resources in two downlink subbands (e.g., downlink subband 620-*a* and downlink subband 620-*b*) separately, which may result in coherence loss across the downlink subbands. In some cases, the UE 115 and/or the network entity 105 may guarantee that after puncturing there are sufficient frequency domain resources in the TRS to achieve accurate delay-spread estimation.

In some examples, if a UE 115 is configured with a set of TRSs (e.g., the TRS 650-*a*, the TRS 650-*b*, the TRS 650-*c*, and the TRS 650-*d*) a TRS of the set of TRSs (e.g., the TRS 650-*c*, and the TRS 650-*d*) overlapping with a guard band (guard band 630-*a* or guard band 630-*b*) or the uplink subband 625-*a* may be considered an error case, and may not be scheduled by the network entity 105.

In some examples, the UE 115 may not process TRS occasions (e.g., the TRS 650-*c*, and the TRS 650-*d*) overlapping with a guard band (guard band 630-*a* or guard band 630-*b*) or the uplink subband 625-*a* (e.g., the UE 115 may drop or suppress monitoring for the TRS 650-*c*, and the TRS 650-*d*). In some examples, the network entity 105 may drop TRS occasions (e.g., the TRS 650-*c*, and the TRS 650-*d*) overlapping with a guard band (guard band 630-*a* or guard band 630-*b*) or the uplink subband 625-*a* (e.g., the network entity 105 may not transmit the TRS 650-*c*, and the TRS 650-*d*).

In some examples, the UE 115 and/or the network entity 105 may puncture TRS occasions (e.g., the TRS 650-*c*, and the TRS 650-*d*) overlapping with a guard band (guard band 630-*a* or guard band 630-*b*) or the uplink subband 625-*a* (e.g., the UE 115 may drop or suppress monitoring for the TRS 650-*c* and the TRS 650-*d*). In some cases, the TRS may be punctured to be contained in the downlink subband 620-*a* and the downlink subband 620-*b*. For example, the portions of the TRS 650-*c* and the TRS 650-*d* that overlap with the guard band (guard band 630-*a* and guard band 630-*b*) and the uplink subband 625-*a* may be punctured, and the UE 115 may receive the TRS 650-*c* and the TRS 650-*d* over non-contiguous frequency domain resources (e.g., the downlink subband 620-*a* and the downlink subband 620-*b*). In some cases, the TRS may be punctured to be contained in the downlink subband 620-*a* and the downlink subband 620-*b*. For example, the portions of the TRS 650-*c* and the TRS 650-*d* that overlap with the guard band (guard band 630-*a* and guard band 630-*b*), the uplink subband 625-*a*, and one of the downlink subbands (the downlink subband 620-*a* or the downlink subband 620-*b*) may be punctured, and the UE 115 may receive the TRS 650-*c* and the TRS 650-*d* over the other downlink subband (e.g., one of the downlink subband 620-*a* and the downlink subband 620-*b*). In some cases, the TRS may be punctured such that the TRS is received on the downlink subband 620-*b* (e.g., the downlink subband having a lower frequency range). In some cases, the TRS may be punctured such that the TRS is received on the downlink subband containing more TRS resources (e.g., the downlink subband 620-*b* has more TRS resources (e.g., a larger bandwidth 655-*a*) for the TRS 650-*c* and the TRS 650-*d* than the downlink subband 620-*a* (e.g., bandwidth 655-*b*)).

In some examples, if the TRS (the TRS 650-*c* and/or the TRS 650-*d*) is punctured, no threshold TRS bandwidths may be configured, which may lead in some cases to small frequency domain resources for a particular TRS. Delay spread estimation accuracy may be low for a TRS with a small bandwidth.

In some examples, if the TRS (the TRS 650-*c* and/or the TRS 650-*d*) is punctured, the UE 115 may monitor for, and/or the network entity 105 may transmit, the TRS if the remaining aggregate bandwidth (across both the downlink subband 620-*a* and the downlink subband 620-*b*) satisfies a threshold. For example, the threshold may be configured in RRC signaling. For example, the UE 115 may monitor for, and/or the network entity 105 may transmit the TRS 650-*c* and/or the TRS 650-*d* if the cumulative bandwidth of the bandwidth 655-*a* and the bandwidth 655-*b* satisfies a threshold.

In some examples, if the TRS (the TRS 650-*c* and/or the TRS 650-*d*) is punctured, the UE 115 may monitor for, and/or the network entity 105 may transmit, the TRS in a given downlink subband (e.g., the downlink subband 620-*a* and the downlink subband 620-*b*) if the bandwidth (e.g., the bandwidth 655-*a* and the bandwidth 655-*b*) satisfies a configured threshold. In some cases, the UE 115 may monitor for, and/or the network entity 105 may transmit, a TRS (e.g., the TRS 650-*c* and/or the TRS 650-*d*) in one downlink subband (e.g., the downlink subband 620-*b*) if the bandwidth 655-*b* for the TRS in that downlink subband 620-*b* satisfies a threshold but the bandwidth 655-*a* for the TRS in the other downlink subband 620-*a* does not satisfy the threshold.

In some cases, the UE 115 and/or the network entity 105 may drop a TRS (e.g., the TRS 650-*c* and/or the TRS 650-*d*) if either of the bandwidth 655-*a* for the TRS in the downlink subband 620-*a* or the bandwidth 655-*b* for the TRS in the downlink subband 620-*b* does not satisfy a threshold (e.g., the frequency domain resources for the TRS in both downlink subbands must satisfy a threshold in order for the TRS to be transmitted/received).

Figure 7:
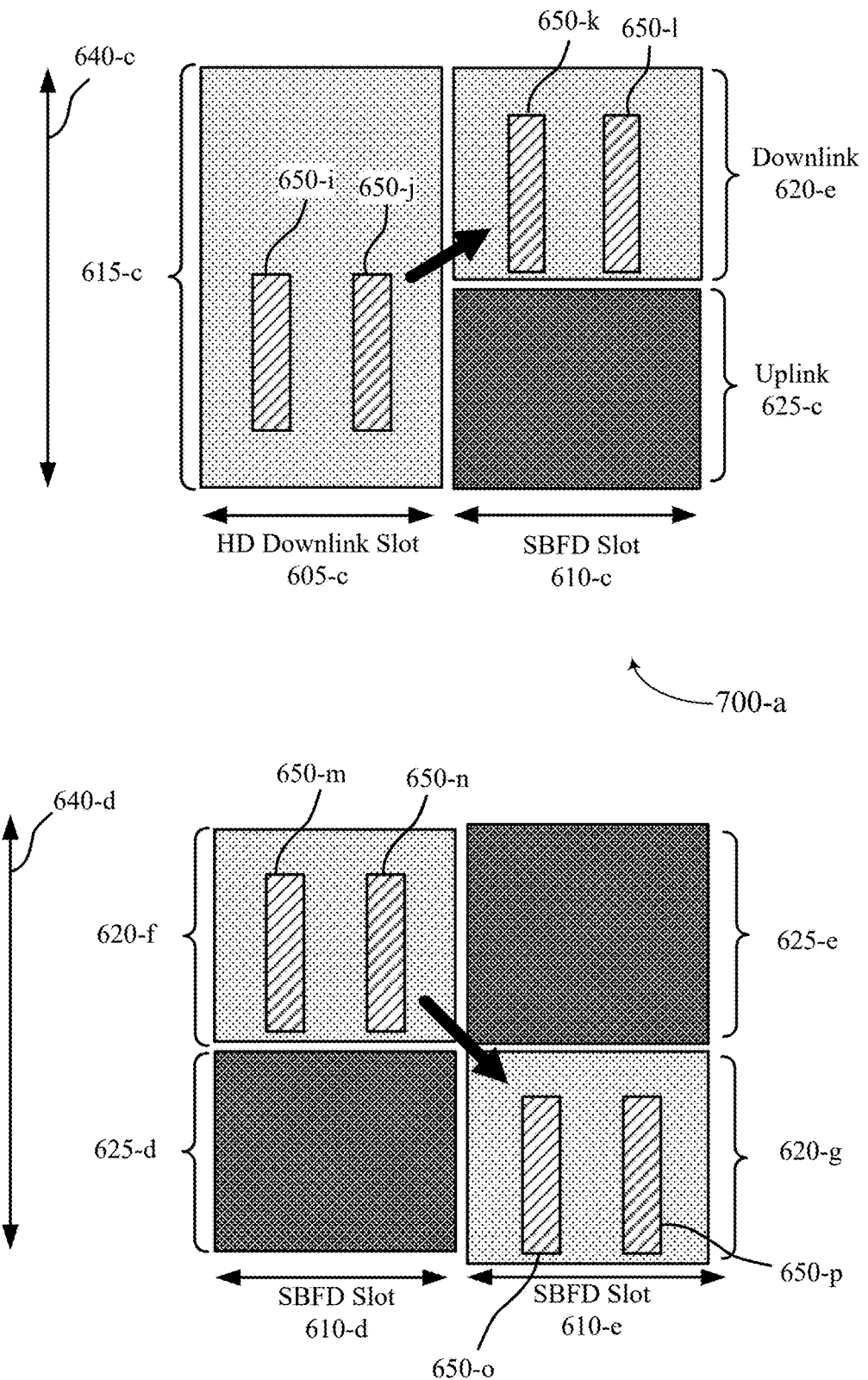
FIG. 7 illustrates an example of a resource diagram that supports tracking reference signals in full duplex operation in accordance with one or more aspects of the present disclosure.

FIG. 7 illustrates an example of a slot format 700-*a* and a slot format 700-*b* that support TRSs in full duplex operation in accordance with one or more aspects of the present disclosure. The slot formats 700-*a* and 700-*b* may implement aspects of the wireless communications system 100, the wireless communications system 300-*a*, the wireless communications system 300-*b*, or the wireless communications system 300-*c*.

In some examples, different frequency domain resources for TRSs 650 may be defined differently in full duplex slots to avoid losing dull duplex resources and to maintain accuracy in measuring delay-spread. For example, slot format 700-*a* includes a half duplex downlink slot 605-*c* and an SBFD slot 610-*c* for a BWP 640-*c* for a UE. The half duplex downlink slot 605-*c* includes a downlink region 615-*c*. The SBFD slot 610-*c* includes a downlink subband 620-*e* and an uplink subband 625-*c*. A TRS 650-*i* and a TRS 650-*j* may be scheduled in the half duplex downlink slot 605-*c*, and a TRS 650-*k* and a TRS 650-1 may be scheduled in the SBFD slot 610-*c*.

In some examples, if a UE 115 is scheduled with TRS occasions that overlap with a guard band or uplink subband (e.g., the uplink subband 625-*c*), the UE 115 and/or the network entity 105 may interpret the resources of the scheduled TRS occasion depending on the slot type. For example, the staring resource block of the TRS 650-*k* and the TRS 650-1 may be interpreted differently in the SBFD slot 610-*c* as compared to the TRS 650-*i* and the TRS 650-*j* in the half duplex downlink slot 605-*c* (e.g., the starting resource block may be shifted such that the TRS 650-*k* and the TRS 650-1 are in the downlink subband 620-*e*).

Slot format 700-*b* includes an SBFD slot 610-*d* and an SBFD slot 610-*e* for a BWP 640-*d* for a UE. The SBFD slot 610-*d* includes a downlink subband 620-*f* and an uplink subband 625-*d*. The SBFD slot 610-*e* includes a downlink subband 620-*g* and an uplink subband 625-*e*. The positions of the downlink subbands (the downlink subband 620-*f* and the downlink subband 620-*g*) and the uplink subbands (the uplink subband 625-*d* and the uplink subband 625-*e*) may switch between the SBFD slot 610-*d* and the SBFD slot 610-*e*. A TRS 650-*m* and a TRS 650-*n* may be scheduled in the SBFD slot 610-*d*, and a TRS 650-*o* and a TRS 650-*p* may be scheduled in the SBFD slot 610-*e*.

In some cases, the UE 115 and the network entity 105 may apply a defined frequency hopping pattern over half duplex and SBFD slots, for examples as shown in the slot format 700-*a* such that the TRSs are scheduled in the downlink resources of the slots. In some examples, the UE 115 and the network entity 105 may apply a defined frequency hopping pattern over different types of SBFD slots, for examples as shown in the slot format 700-*b* such that the TRSs are scheduled in the downlink subbands of the SBFD slots.

Figure 8:
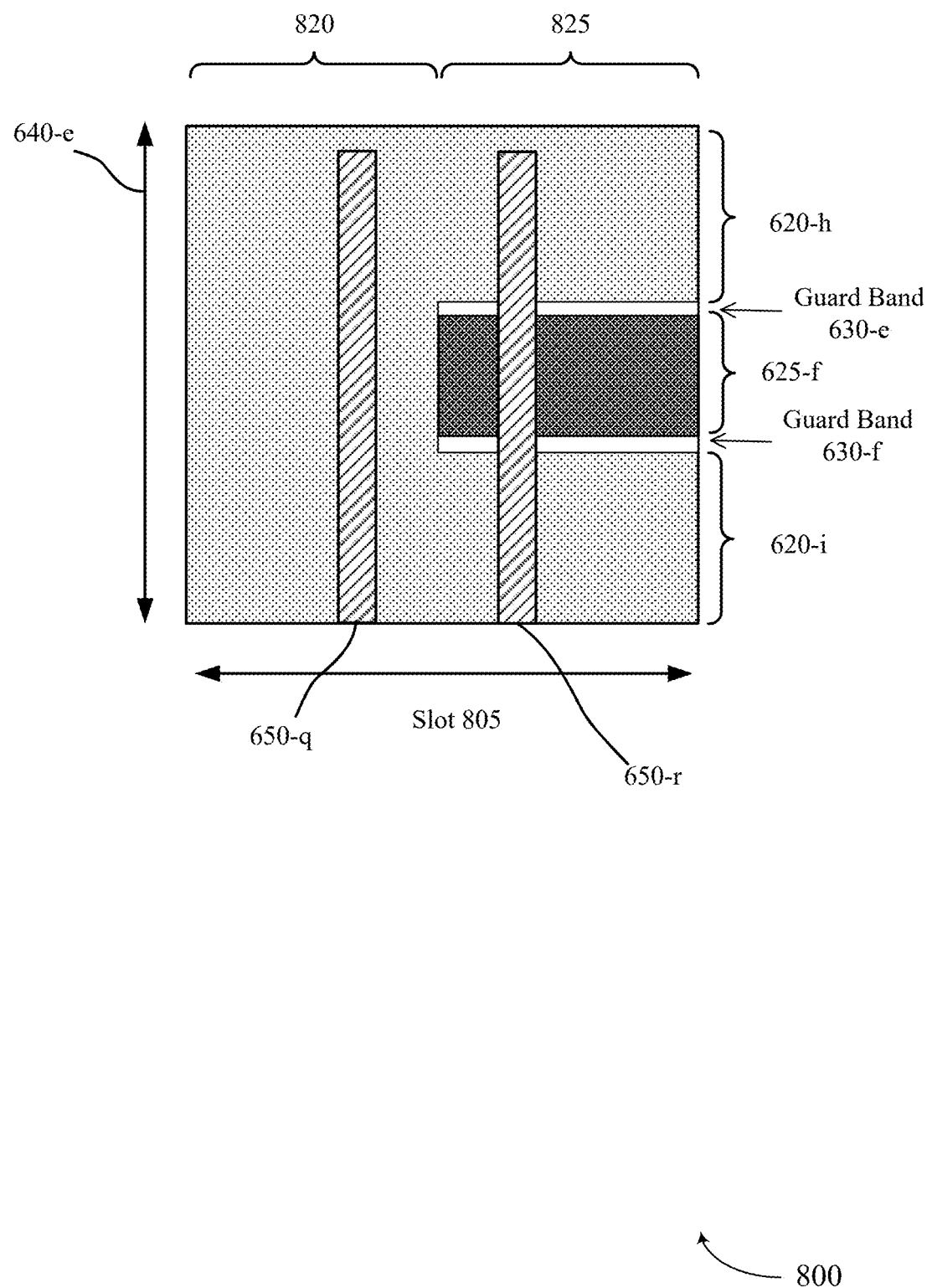
FIG. 8 illustrates an example of a resource diagram format that supports tracking reference signals in full duplex operation in accordance with one or more aspects of the present disclosure.

FIG. 8 illustrates an example of a slot format 800 that supports TRSs in full duplex operation in accordance with one or more aspects of the present disclosure. The slot format 800 may implement aspects of the wireless communications system 100, the wireless communications system 300-*a*, the wireless communications system 300-*b*, or the wireless communications system 300-*c*.

A slot 805 may include half duplex symbols 820 and SBFD symbols 825 (e.g., D+U symbols) for a BWP 640-*e* for a UE 115. The SBFD symbols 825 may include a downlink subband 620-*h*, a downlink subband 620-*i*, an uplink subband 625-*f*, and guard bands (guard band 630-*e* and guard band 630-*f*). Within a slot 805, a TRS 650-*q* may be scheduled in a half duplex symbol(s) 820 (e.g., in a downlink symbol) and a TRS 650-*r* may be scheduled in an SBFD symbol(s) 825. The TRS 650-*r* may be scheduled in the uplink subband 625-*f* and/or the guard band(s) (guard band 630-*e* and/or guard band 630-*f*), which may affect the estimation accuracy of doppler spread.

As described with reference to TRSs scheduled across half duplex slots and SBFD slots, in some examples, the network entity 105 may not configure a TRS 650-*r* to overlap with the uplink subband 625-*f* and/or the guard band(s) (guard band 630-*e* and guard band 630-*f*) (e.g., such an overlap is an error case). As described with reference to TRSs scheduled across half duplex slots and SBFD slots, in some examples, the UE 115 and/or the network entity 105 may drop the TRS 650-*r* based on the TRS 650-*r* overlapping with the uplink subband 625-*f* and/or the guard band(s)

(guard band 630-*e* and guard band 630-*f*). As described with reference to TRSs scheduled across half duplex slots and SBFD slots, in some examples, the UE 115 and/or the network entity 105 may puncture the TRS 650-*r* such that the TRS 650-*r* is received in one or both of the downlink subband 620-*h* or the downlink subband 620-*i*.

Figure 9:
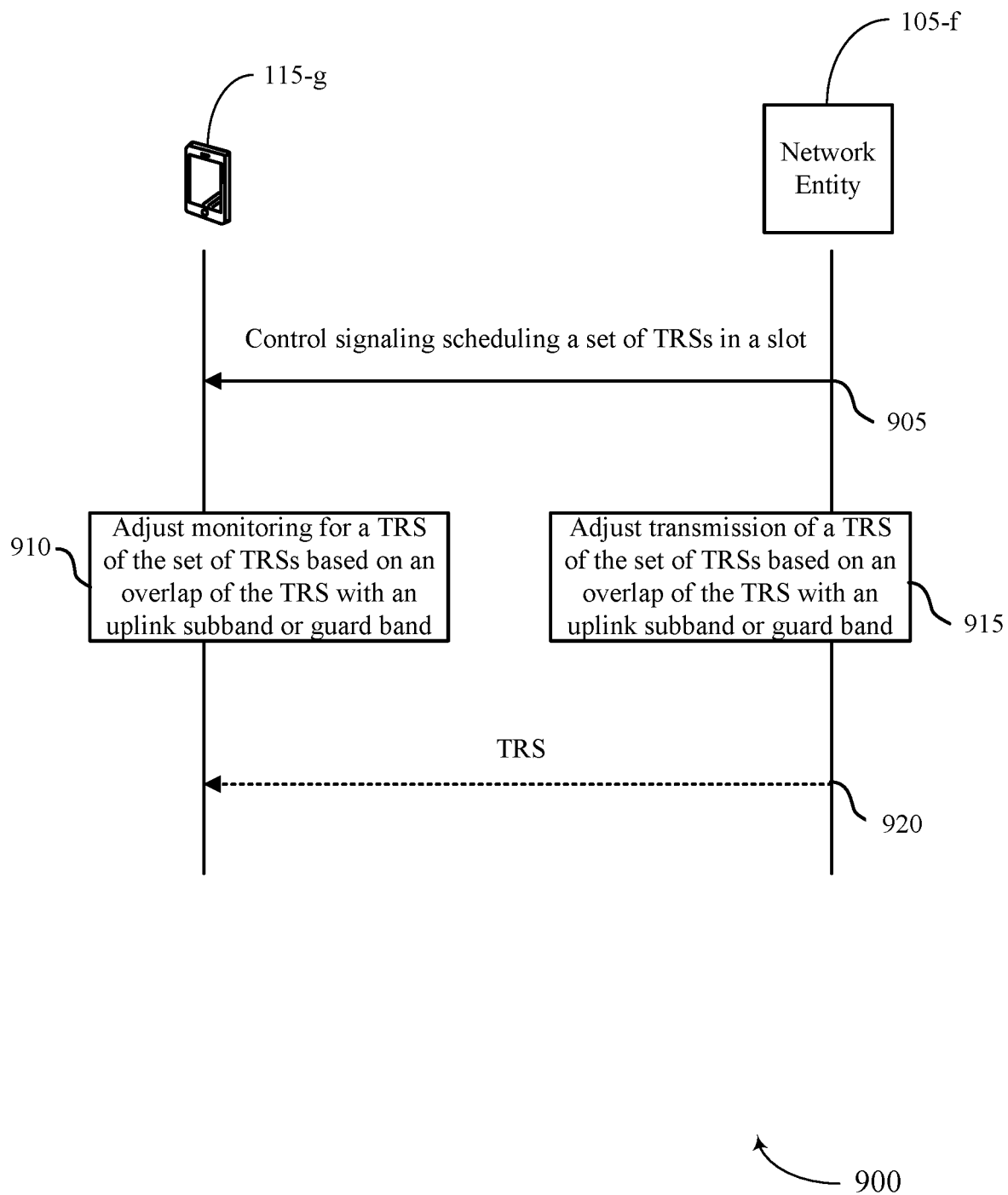
FIG. 9 illustrates an example of a process flow that supports tracking reference signals in full duplex operation in accordance with one or more aspects of the present disclosure.

FIG. 9 illustrates an example of a process flow 900 that supports TRSs in a full duplex network in accordance with one or more aspects of the present disclosure. The process flow 900 may include a UE 115-*g*, which may be an example of a UE 115 as described herein. The process flow 900 may include a network entity 105-*f*, which may be an example of a network entity 105 as described herein. In the following description of the process flow 900, the operations between the network entity 105-*f* and the UE 115-*g* may be transmitted in a different order than the example order shown, or the operations performed by the network entity 105-*f* and the UE 115-*g* may be performed in different orders or at different times. Some operations may also be omitted from the process flow 900, and other operations may be added to the process flow 900.

At 905, the UE 115-*g* may receive, from the network entity 105-*f*, control signaling scheduling a set of TRSs in a slot. The slot may include an uplink subband, a downlink subband and a guard band positioned between the uplink subband and the downlink subband. A portion of a TRS of the set of TRSs may overlap with at least one of the uplink subband or the guard band.

At 910, the UE 115-*g* may adjust monitoring for the TRS based on the portion of the TRS overlapping with at least one of the guard band or the uplink subband.

At 915, the network entity 105-*f* may adjust transmission of the TRS based on the portion of the TRS overlapping with at least one of the guard band or the uplink subband.

In some examples, at 920, the network entity 105-*f* may transmit the TRS in accordance with the adjustment at 915, and the UE 115-*g* may receive the TRS in accordance with the adjusted monitoring at 910.

In some examples, the UE 115-*g* may suppress monitoring the TRS based on the portion of the TRS overlapping with the uplink subband or the guard band.

In some examples, the network entity 105-*f* may suppress transmission of the TRS based on the portion of the TRS overlapping with at least one of the guard band or the uplink subband.

In some examples, the UE 115-*g* may suppress monitoring for the portion of the TRS and may receive the TRS via a second portion of the TRS overlapping the downlink subband. In some examples, the UE 115-*g* may receive the TRS via the second portion based on the second portion satisfying a threshold bandwidth. In some examples, the UE 115-*g* may receive the TRS via a third portion of the TRS that overlaps with a second downlink subband of the slot, where the second downlink subband is non-contiguous in frequency (e.g., in the frequency domain) with the downlink subband. In some cases, the UE 115-*g* may receive the TRS via the second portion and the third portion based on the second portion and the third portion satisfying a cumulative threshold bandwidth. In some cases, the UE 115-*g* may receive the TRS via the second portion and the third portion based on the second portion and the third portion each satisfying a threshold bandwidth. In some examples, the UE 115-*g* may suppress monitoring for a third portion of the TRS that overlaps with a second downlink subband of the slot, where the second downlink subband is non-contiguous in frequency with the downlink subband. In some cases, suppressing monitoring for the third portion includes suppressing monitoring for the third portion based on the second portion including more TRS resources than the third portion. In some cases, suppressing monitoring for the third portion includes suppressing monitoring for the third portion based on the third portion failing to satisfy a threshold bandwidth.

In some examples, the network entity 105-*f* may suppress transmission of the portion of the TRS and transmit the TRS via a second portion of the TRS that overlaps with the downlink subband. In some examples, the network entity 105-*f* may transmit the TRS via the second portion based on the second portion satisfying a threshold bandwidth. In some examples, the network entity 105-*f* may transmit the TRS via a third portion of the TRS that overlaps with a second downlink subband of the slot, where the second downlink subband is non-contiguous in frequency with the downlink subband. In some cases, the network entity 105-*f* may transmit the TRS via the second portion and the third portion based on the second portion and the third portion satisfying a cumulative threshold bandwidth. In some cases, the network entity 105-*f* may transmit the TRS via the second portion and the third portion based on the second portion and the third portion each satisfying a threshold bandwidth. In some examples, the network entity 105-*f* may suppress transmission of a third portion of the TRS that overlaps with a second downlink subband of the slot, where the second downlink subband is non-contiguous in frequency with the downlink subband. In some cases, suppressing transmission of the third portion includes suppressing transmission of the third portion based on the second portion including more TRS resources than the third portion. In some cases, suppressing transmission of the third portion includes transmission of the third portion based on the third portion failing to satisfy a threshold bandwidth.

In some cases, adjusting monitoring for the TRS includes shifting monitored resources for the TRS in frequency such that the monitored resources for the TRS are within the downlink subband. In some cases, adjusting transmission of the TRS includes shifting monitored resources for the TRS in frequency such that the monitored resources for the TRS are within the downlink subband.

In some examples, the UE 115-*g* may receive, and the network entity 105-*f* may transmit, a second TRS of the scheduled set of TRSs in a half duplex symbol of the slot, and the TRS is scheduled in an SBFD symbol of the slot.

In some examples, the slot is an SBFD slot. In some examples, the control signaling at 905 may include an indication of frequency hopping pattern to apply to TRSs in SBFD slots and half duplex slots. Adjusting monitoring for and adjusting transmission of the TRS may include applying the frequency hopping pattern to the TRS such that the TRS is within the downlink subband based on the slot being an SBFD slot.

Figure 10:
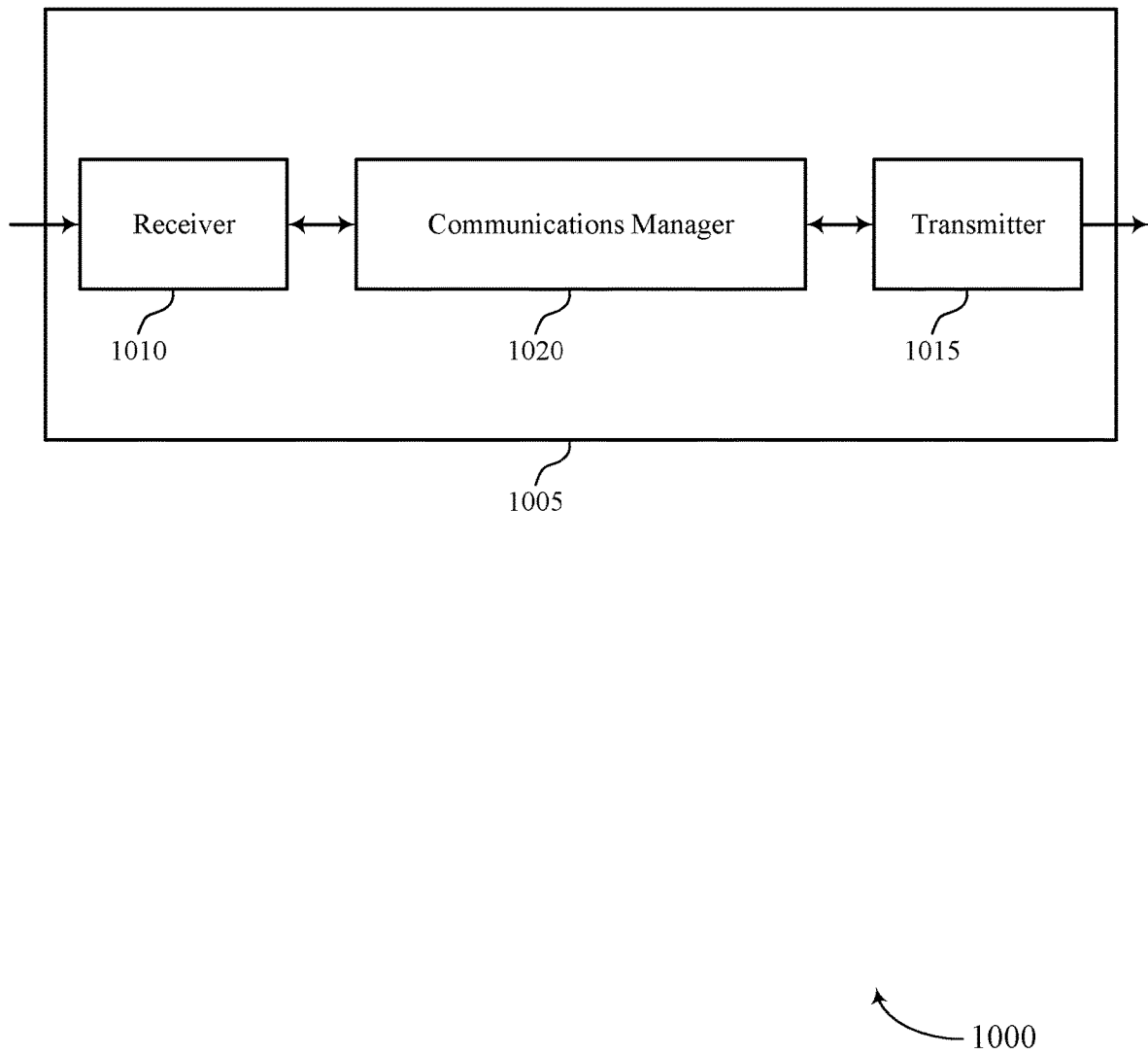
FIGS. 10 and 11 show block diagrams of devices that support tracking reference signals in full duplex operation in accordance with one or more aspects of the present disclosure.

FIG. 10 shows a block diagram 1000 of a device 1005 that supports TRSs in full duplex operation in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to TRS in full duplex operation).

Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to TRS in full duplex operation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of TRS in full duplex operation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The communications manager 1020 may be configured as or otherwise support a means for adjusting monitoring for the TRS based on the portion of the TRS overlapping with at least one of the guard band or the uplink subband.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
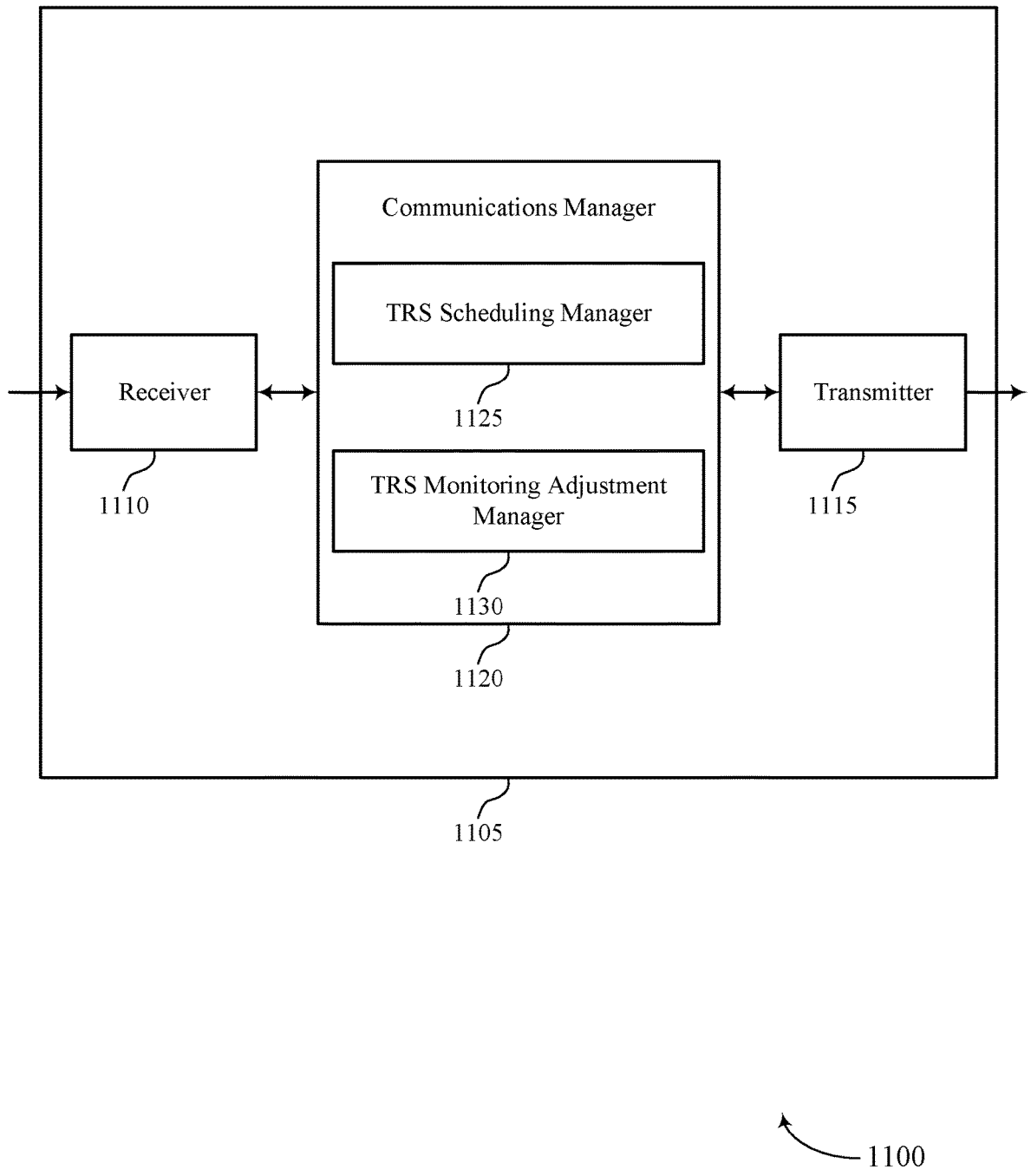

FIG. 11 shows a block diagram 1100 of a device 1105 that supports TRSs in full duplex operation in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to TRS in full duplex operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to TRS in full duplex operation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of TRS in full duplex operation as described herein. For example, the communications manager 1120 may include a TRS scheduling manager 1125 an TRS monitoring adjustment manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The TRS scheduling manager 1125 may be configured as or otherwise support a means for receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The TRS monitoring adjustment manager 1130 may be configured as or otherwise support a means for adjusting monitoring for the TRS based on the portion of the TRS overlapping with at least one of the guard band or the uplink subband.

Figure 12:
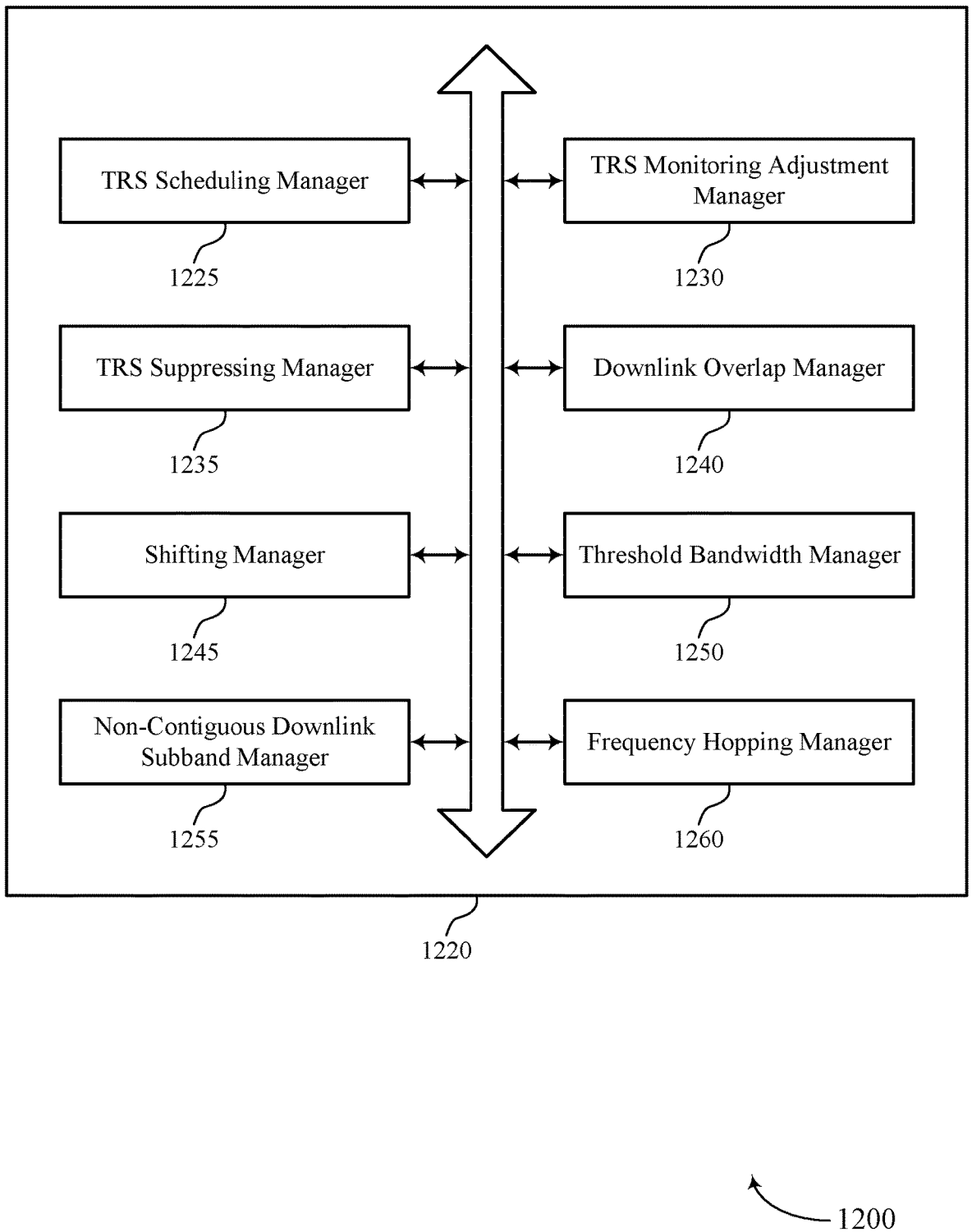
FIG. 12 shows a block diagram of a communications manager that supports tracking reference signals in full duplex operation in accordance with one or more aspects of the present disclosure.

FIG. 12 shows a block diagram 1200 of a communications manager 1220 that supports TRSs in full duplex operation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of TRS in full duplex operation as described herein. For example, the communications manager 1220 may include a TRS scheduling manager 1225, an TRS monitoring adjustment manager 1230, a TRS suppressing manager 1235, a downlink overlap manager 1240, a shifting manager 1245, a threshold bandwidth manager 1250, a non-contiguous downlink subband manager 1255, a frequency hopping manager 1260, or any combination thereof. Each of these components may communicate, directly or indirectly, with one another (e.g., via one or more buses).

The communications manager 1220 may support wireless communications at a UE in accordance with examples as disclosed herein. The TRS scheduling manager 1225 may be configured as or otherwise support a means for receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The TRS monitoring adjustment manager 1230 may be configured as or otherwise support a means for adjusting monitoring for the TRS based on the portion of the TRS overlapping with at least one of the guard band or the uplink subband.

In some examples, the TRS suppressing manager 1235 may be configured as or otherwise support a means for suppressing monitoring for the TRS based on the portion of the TRS overlapping with at least one of the guard band or the uplink subband.

In some examples, the TRS suppressing manager 1235 may be configured as or otherwise support a means for suppressing monitoring for the portion of the TRS. In some examples, the downlink overlap manager 1240 may be configured as or otherwise support a means for receiving the TRS via a second portion of the TRS that overlaps with the downlink subband.

In some examples, to support receiving the TRS via the second portion, the threshold bandwidth manager 1250 may be configured as or otherwise support a means for receiving the TRS based on the second portion satisfying a threshold bandwidth.

In some examples, the non-contiguous downlink subband manager 1255 may be configured as or otherwise support a means for receiving the TRS via a third portion of the TRS that overlaps with a second downlink subband of the slot, where the second downlink subband is non-contiguous in frequency with the downlink subband.

In some examples, to support receiving the TRS via the second portion and the third portion, the threshold bandwidth manager 1250 may be configured as or otherwise support a means for receiving the TRS based on the second portion and the third portion satisfying a cumulative threshold bandwidth.

In some examples, to support receiving the TRS via the second portion and the third portion, the threshold bandwidth manager 1250 may be configured as or otherwise support a means for receiving the TRS based on the second portion and the third portion each satisfying a threshold bandwidth.

In some examples, the non-contiguous downlink subband manager 1255 may be configured as or otherwise support a means for suppressing monitoring for a third portion of the TRS that overlaps with a second downlink subband of the slot, where the second downlink subband is non-contiguous in frequency with the downlink subband.

In some examples, to support suppressing monitoring for the third portion, the TRS suppressing manager 1235 may be configured as or otherwise support a means for suppressing monitoring for the third portion based on the second portion including more TRS resources than the third portion.

In some examples, to support suppressing monitoring for the third portion, the threshold bandwidth manager 1250 may be configured as or otherwise support a means for suppressing monitoring for the third portion based on the third portion failing to satisfy a threshold bandwidth.

In some examples, to support adjusting monitoring for the TRS, the shifting manager 1245 may be configured as or otherwise support a means for shifting monitored resources for the TRS in frequency such that the monitored resources for the TRS are within the downlink subband.

In some examples, the TRS scheduling manager 1225 may be configured as or otherwise support a means for receiving a second TRS of the scheduled set of TRSs in a half duplex symbol of the slot, where the TRS is scheduled in an SBFD symbol of the slot.

In some examples, the slot includes an SBFD slot.

In some examples, to support receiving the control signaling, the frequency hopping manager 1260 may be configured as or otherwise support a means for receiving an indication of a frequency hopping pattern to apply to TRSs in SBFD slots and half duplex slots, where adjusting monitoring for the TRS includes applying the frequency hopping pattern to the TRS such that the TRS is within the downlink subband based on the slot being an SBFD slot.

Figure 13:
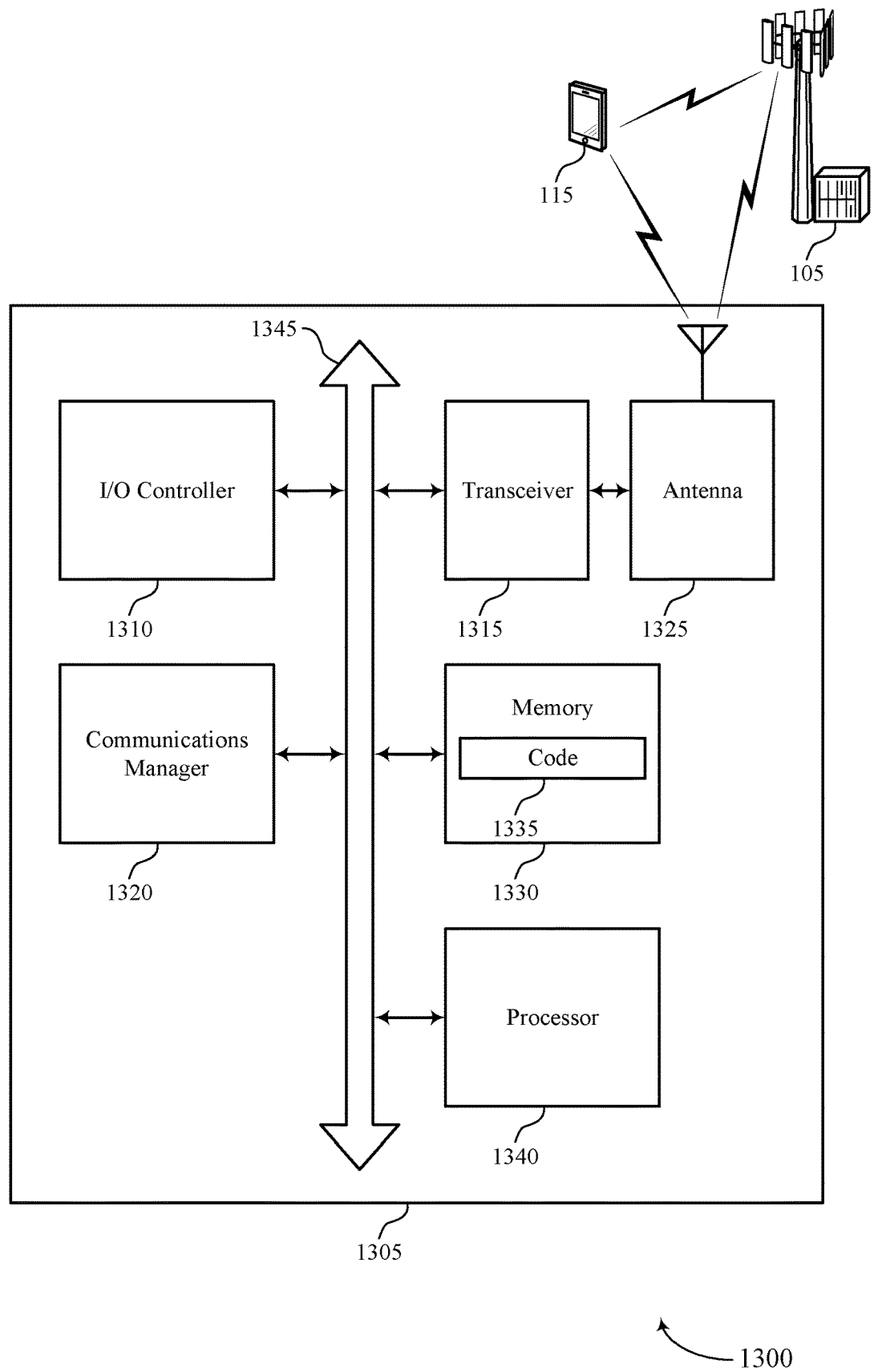
FIG. 13 shows a diagram of a system including a device that supports tracking reference signals in full duplex operation in accordance with one or more aspects of the present disclosure.

FIG. 13 shows a diagram of a system 1300 including a device 1305 that supports TRSs in full duplex operation in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305.

In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting TRS in full duplex operation). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The communications manager 1320 may be configured as or otherwise support a means for adjusting monitoring for the TRS based on the portion of the TRS overlapping with at least one of the guard band or the uplink subband.

By including or configuring the communications manager 1320 in accordance with examples as described herein, the device 1305 may support techniques for reduced power consumption, more efficient utilization of communication resources, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of TRS in full duplex operation as described herein, or the processor 1340 and the memory 1330 may be otherwise configured to perform or support such operations.

Figure 14:
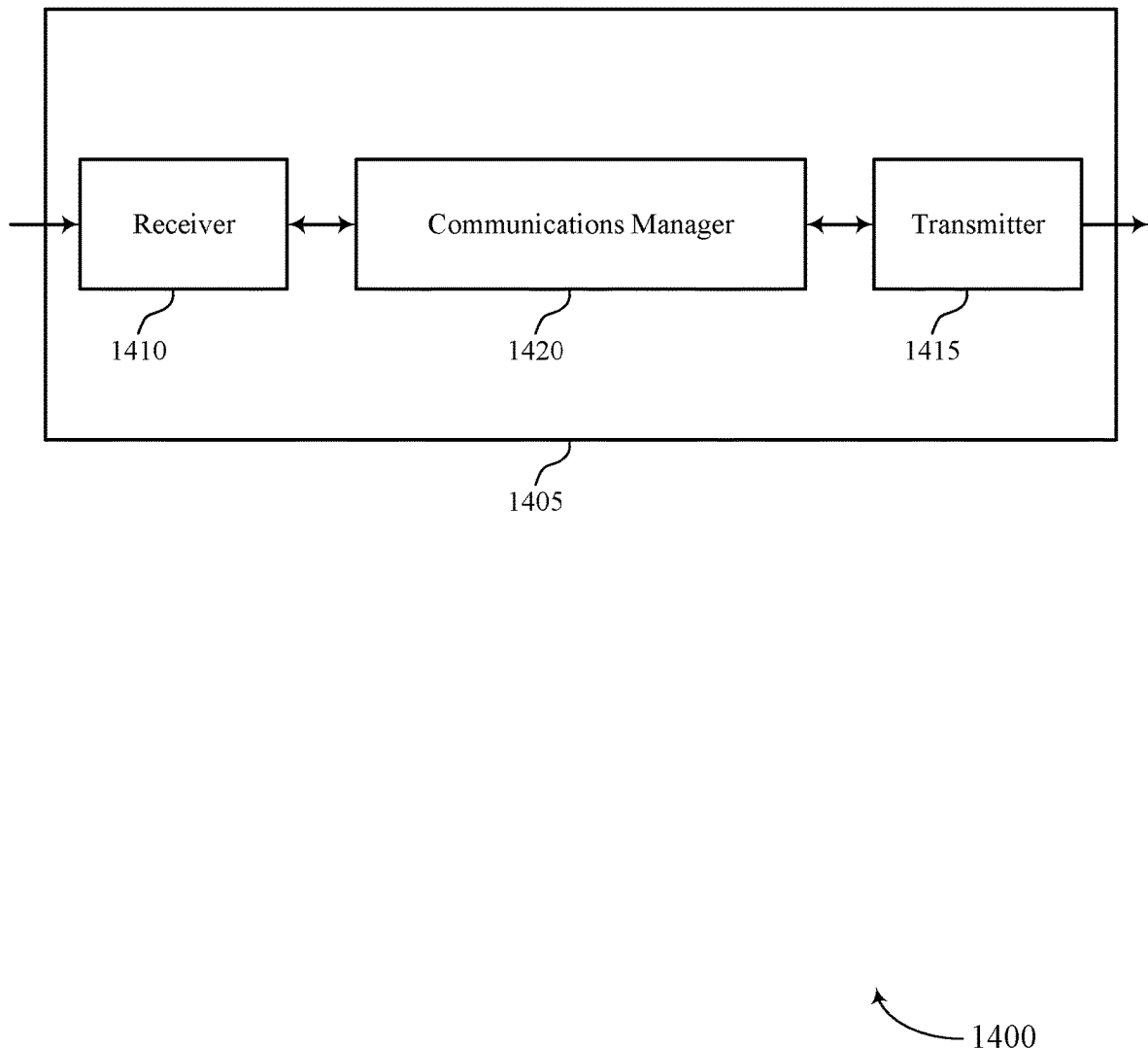
FIGS. 14 and 15 show block diagrams of devices that support tracking reference signals in full duplex operation in accordance with one or more aspects of the present disclosure.

FIG. 14 shows a block diagram 1400 of a device 1405 that supports TRSs in full duplex operation in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of TRS in full duplex operation as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The communications manager 1420 may be configured as or otherwise support a means for adjusting transmission of the TRS based on the portion of the TRS overlapping with at least one of the guard band or the uplink subband.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for more efficient utilization of communication resources.

Figure 15:
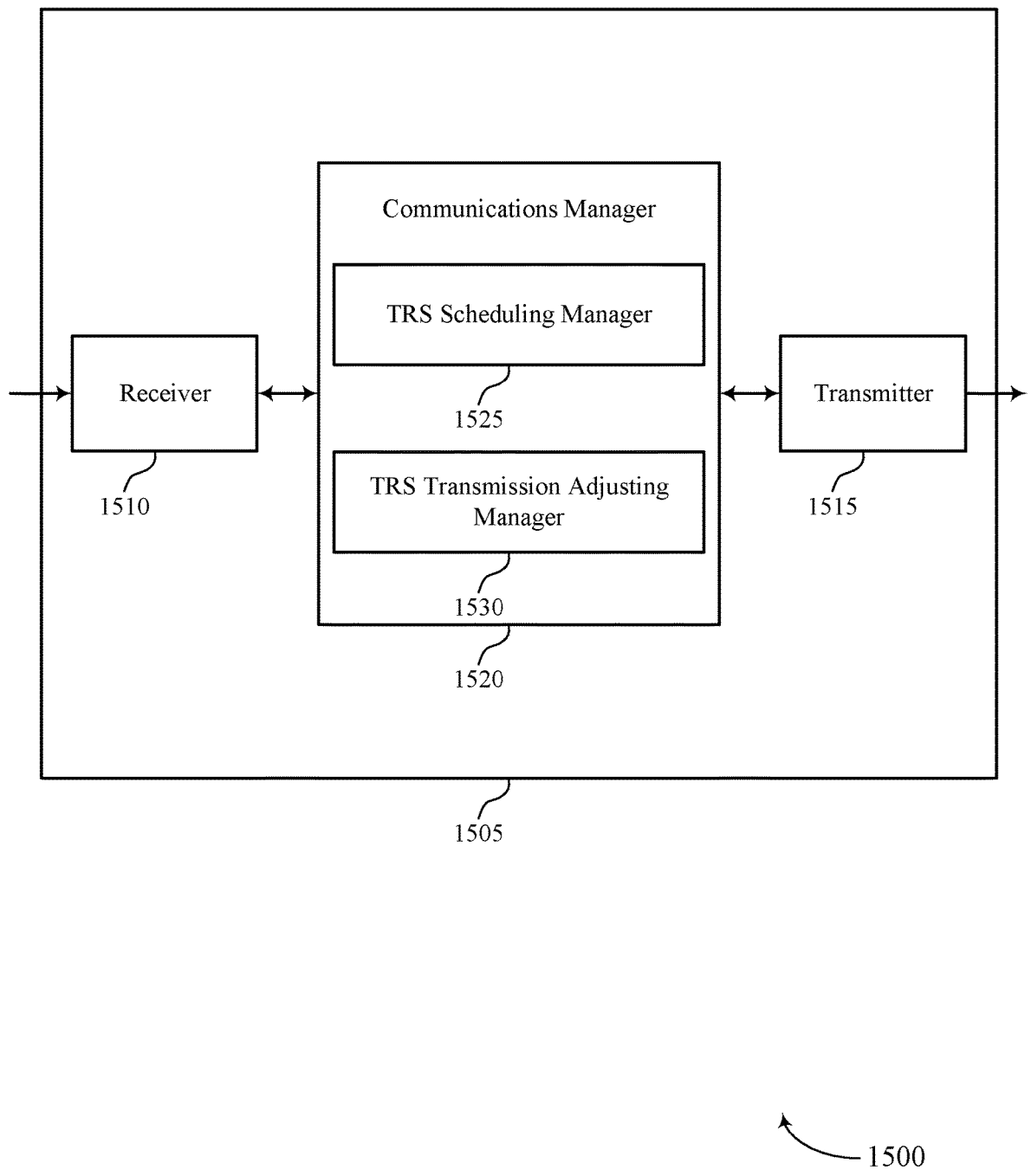

FIG. 15 shows a block diagram 1500 of a device 1505 that supports TRSs in full duplex operation in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of TRS in full duplex operation as described herein. For example, the communications manager 1520 may include a TRS scheduling manager 1525, a TRS transmission adjustment manager 1530, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The TRS scheduling manager 1525 may be configured as or otherwise support a means for transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The TRS transmission adjustment manager 1530 may be configured as or otherwise support a means for adjusting transmission of the TRS based on the portion of the TRS overlapping with at least one of the guard band or the uplink subband.

Figure 16:
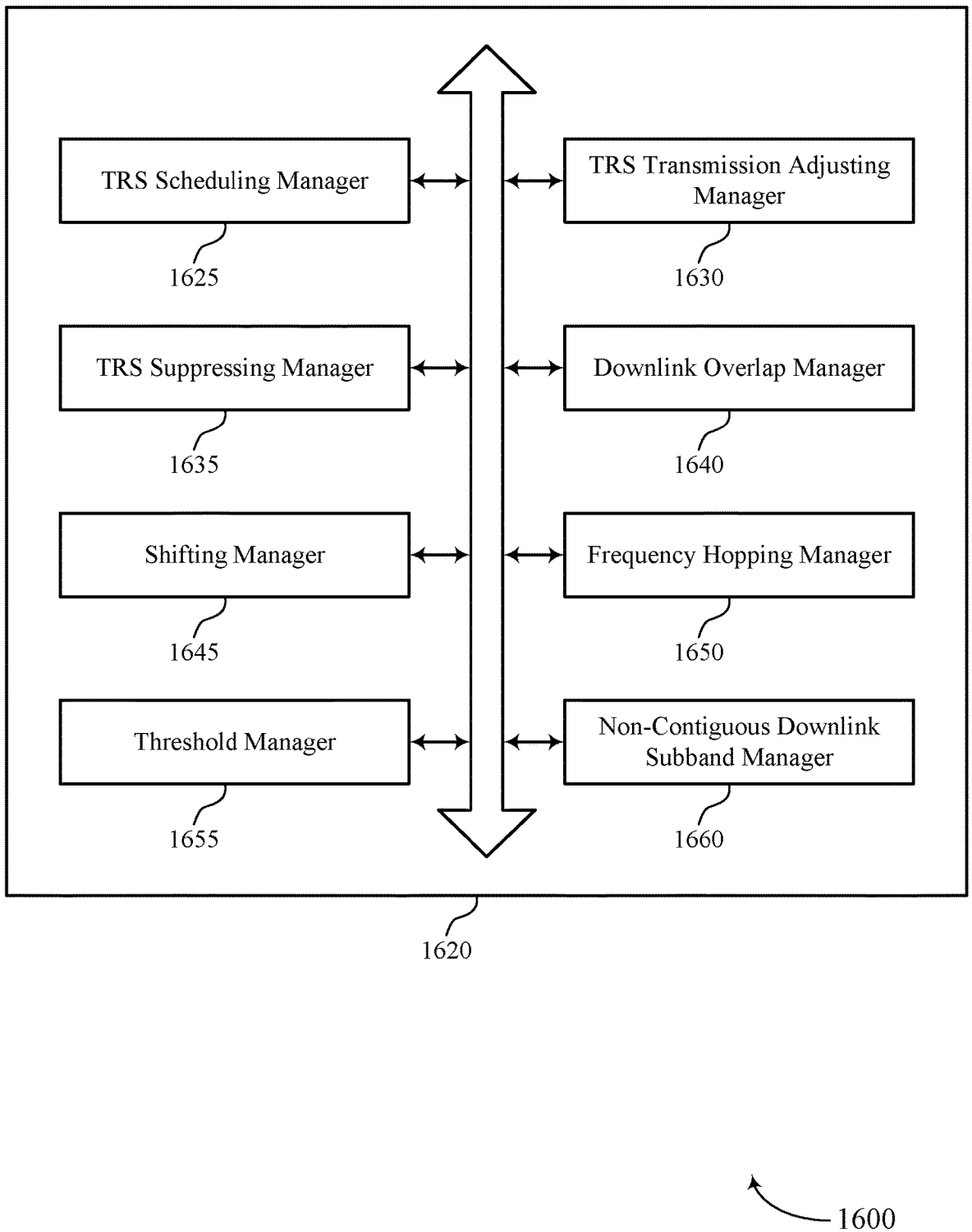
FIG. 16 shows a block diagram of a communications manager that supports tracking reference signals in full duplex operation in accordance with one or more aspects of the present disclosure.

FIG. 16 shows a block diagram 1600 of a communications manager 1620 that supports TRSs in full duplex operation in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of TRS in full duplex operation as described herein. For example, the communications manager 1620 may include a TRS scheduling manager 1625, a TRS transmission adjustment manager 1630, a TRS suppressing manager 1635, a downlink overlap manager 1640, a shifting manager 1645, a frequency hopping manager 1650, a threshold manager 1655, a non-contiguous downlink subband manager 1660, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The TRS scheduling manager 1625 may be configured as or otherwise support a means for transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The TRS transmission adjustment manager 1630 may be configured as or otherwise support a means for adjusting transmission of the TRS based on the portion of the TRS overlapping with at least one of the guard band or the uplink subband.

In some examples, the TRS suppressing manager 1635 may be configured as or otherwise support a means for suppressing transmission of the TRS based on the portion of the TRS overlapping with at least one of the guard band or the uplink subband.

In some examples, the TRS suppressing manager 1635 may be configured as or otherwise support a means for suppressing transmission of the portion of the TRS. In some examples, the downlink overlap manager 1640 may be configured as or otherwise support a means for transmitting the TRS via a second portion of the TRS that overlaps with the downlink subband.

In some examples, to support transmitting the TRS via the second portion, the threshold manager 1655 may be configured as or otherwise support a means for transmitting the TRS based on the second portion satisfying a threshold bandwidth.

In some examples, the non-contiguous downlink subband manager 1660 may be configured as or otherwise support a means for transmitting the TRS via a third portion of the TRS that overlaps with a second downlink subband of the slot, where the second downlink subband is non-contiguous in frequency with the downlink subband.

In some examples, to support transmitting the TRS via the second portion and the third portion, the threshold manager 1655 may be configured as or otherwise support a means for transmitting the TRS based on the second portion and the third portion satisfying a cumulative threshold bandwidth.

In some examples, to support transmitting the TRS via the second portion and the third portion, the threshold manager 1655 may be configured as or otherwise support a means for transmitting the TRS based on the second portion and the third portion each satisfying a threshold bandwidth.

In some examples, the non-contiguous downlink subband manager 1660 may be configured as or otherwise support a means for suppressing transmission of a third portion of the TRS that overlaps with a second downlink subband of the slot, where the second downlink subband is non-contiguous in frequency with the downlink subband.

In some examples, to support suppressing transmission of the third portion, the TRS suppressing manager 1635 may be configured as or otherwise support a means for suppressing transmission of the third portion based on the second portion including more TRS resources than the third portion.

In some examples, to support suppressing transmission of the third portion, the threshold manager 1655 may be configured as or otherwise support a means for suppressing transmission of the third portion based on the third portion failing to satisfy a threshold bandwidth.

In some examples, to support adjusting transmission of the TRS, the shifting manager 1645 may be configured as or otherwise support a means for shifting the TRS in frequency such that the TRS is within the downlink subband.

In some examples, the TRS scheduling manager 1625 may be configured as or otherwise support a means for transmitting a second TRS of the scheduled set of TRSs in a half duplex symbol of the slot, where the TRS is scheduled in an SBFD symbol of the slot.

In some examples, the slot includes an SBFD slot.

In some examples, to support transmitting the control signaling, the frequency hopping manager 1650 may be configured as or otherwise support a means for transmitting an indication of a frequency hopping pattern to apply to TRSs in SBFD slots and half duplex slots, where adjusting transmission of the TRS includes applying the frequency hopping pattern to the TRS such that the TRS is within the downlink subband based on the slot being an SBFD slot.

Figure 17:
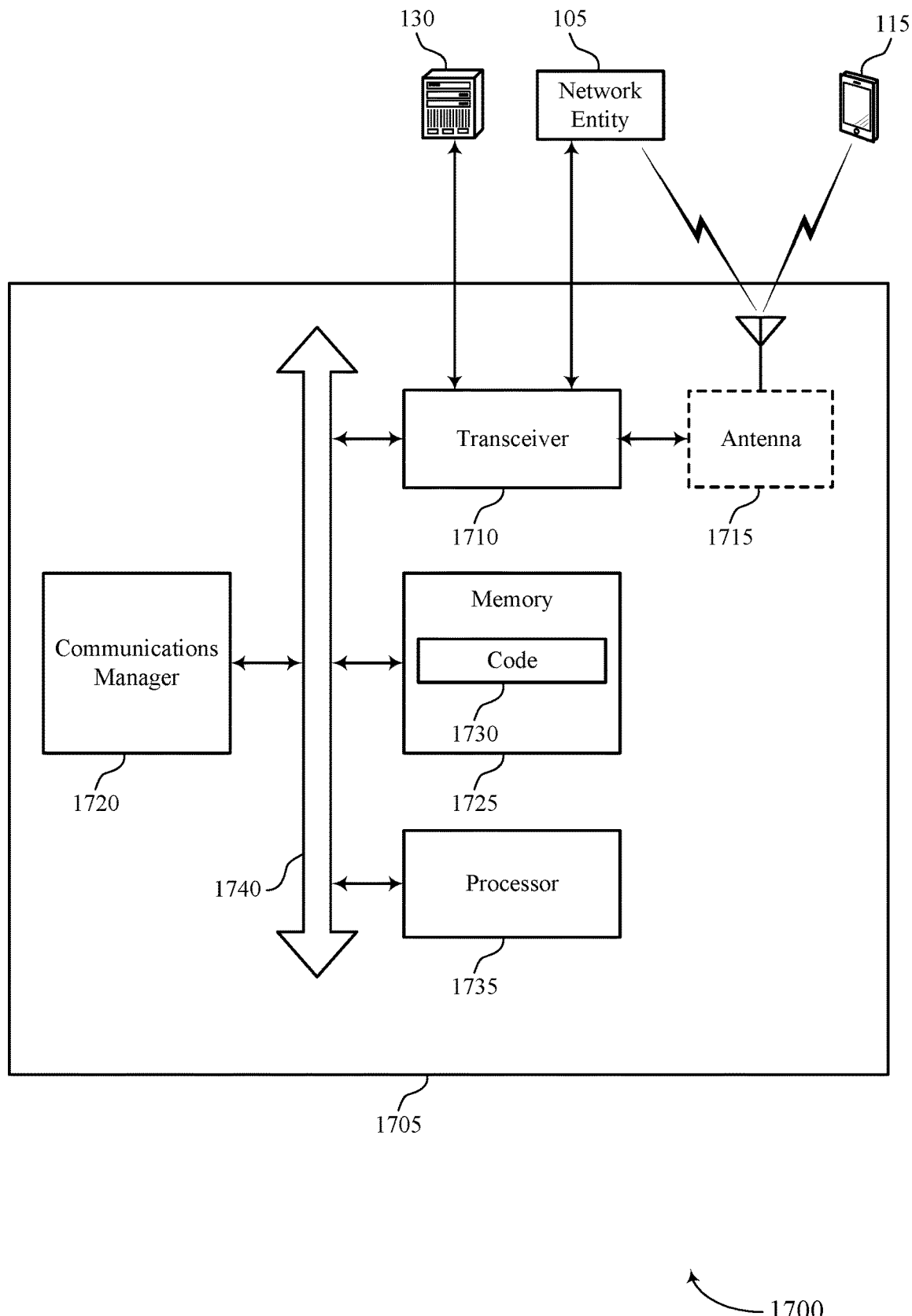
FIG. 17 shows a diagram of a system including a device that supports tracking reference signals in full duplex operation in accordance with one or more aspects of the present disclosure.

FIG. 17 shows a diagram of a system 1700 including a device 1705 that supports TRSs in full duplex operation in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting TRS in full duplex operation). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The communications manager 1720 may be configured as or otherwise support a means for adjusting transmission of the TRS based on the portion of the TRS overlapping with at least one of the guard band or the uplink subband.

By including or configuring the communications manager 1720 in accordance with examples as described herein, the device 1705 may support techniques for reduced power consumption, more efficient utilization of communication resources, and improved utilization of processing capability.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of TRS in full duplex operation as described herein, or the processor 1735 and the memory 1725 may be otherwise configured to perform or support such operations.

Figure 18:
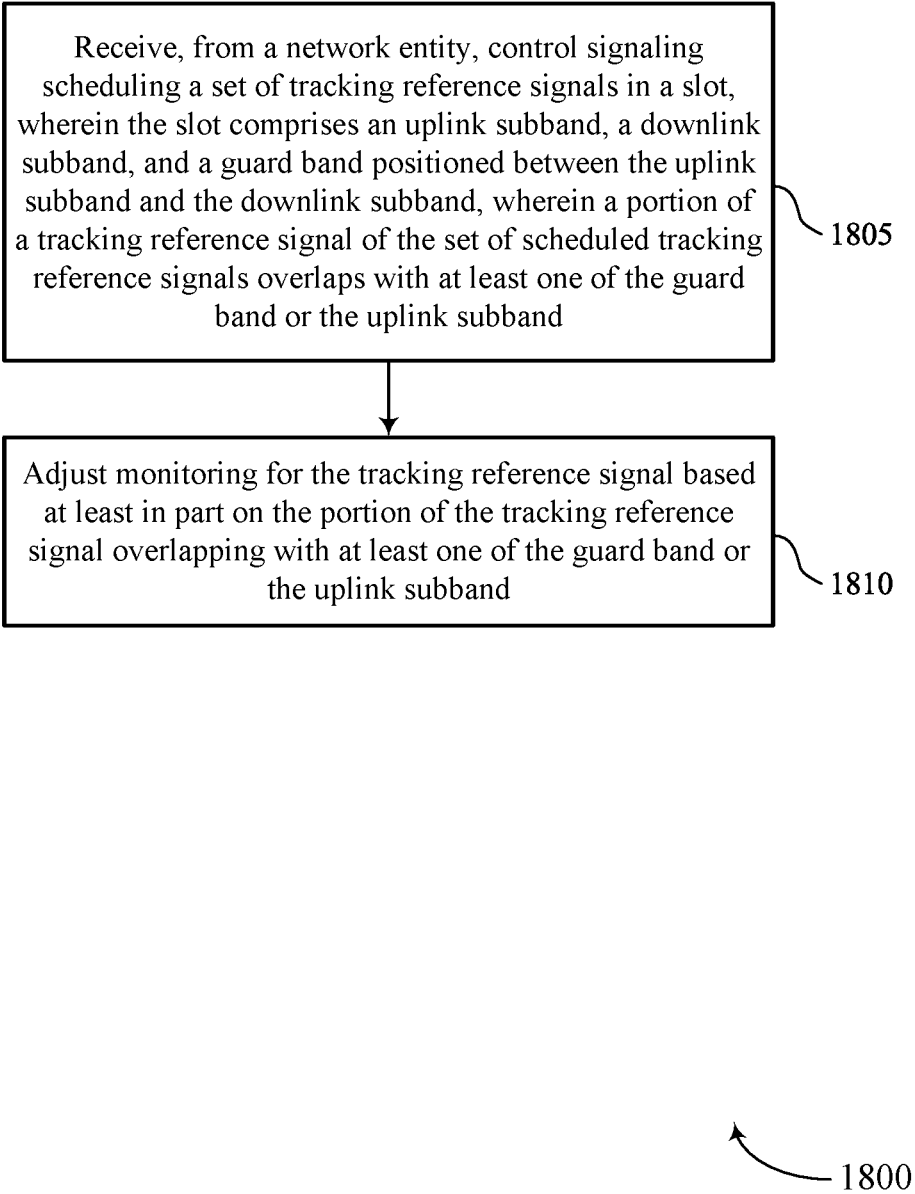
FIGS. 18 through 21 show flowcharts illustrating methods that support tracking reference signals in full duplex operation in accordance with one or more aspects of the present disclosure.

FIG. 18 shows a flowchart illustrating a method 1800 that supports TRSs in full duplex operation in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The operations of 1805 may be performed in accordance with examples as disclosed herein. In some examples, aspects of the operations of 1805 may be performed by a TRS scheduling manager 1225 as described with reference to FIG. 12.

At 1810, the method may include adjusting monitoring for the TRS based on the portion of the TRS overlapping with at least one of the guard band or the uplink subband. The operations of 1810 may be performed in accordance with examples as disclosed herein. In some examples, aspects of the operations of 1810 may be performed by an TRS monitoring adjustment manager 1230 as described with reference to FIG. 12.

Figure 19:
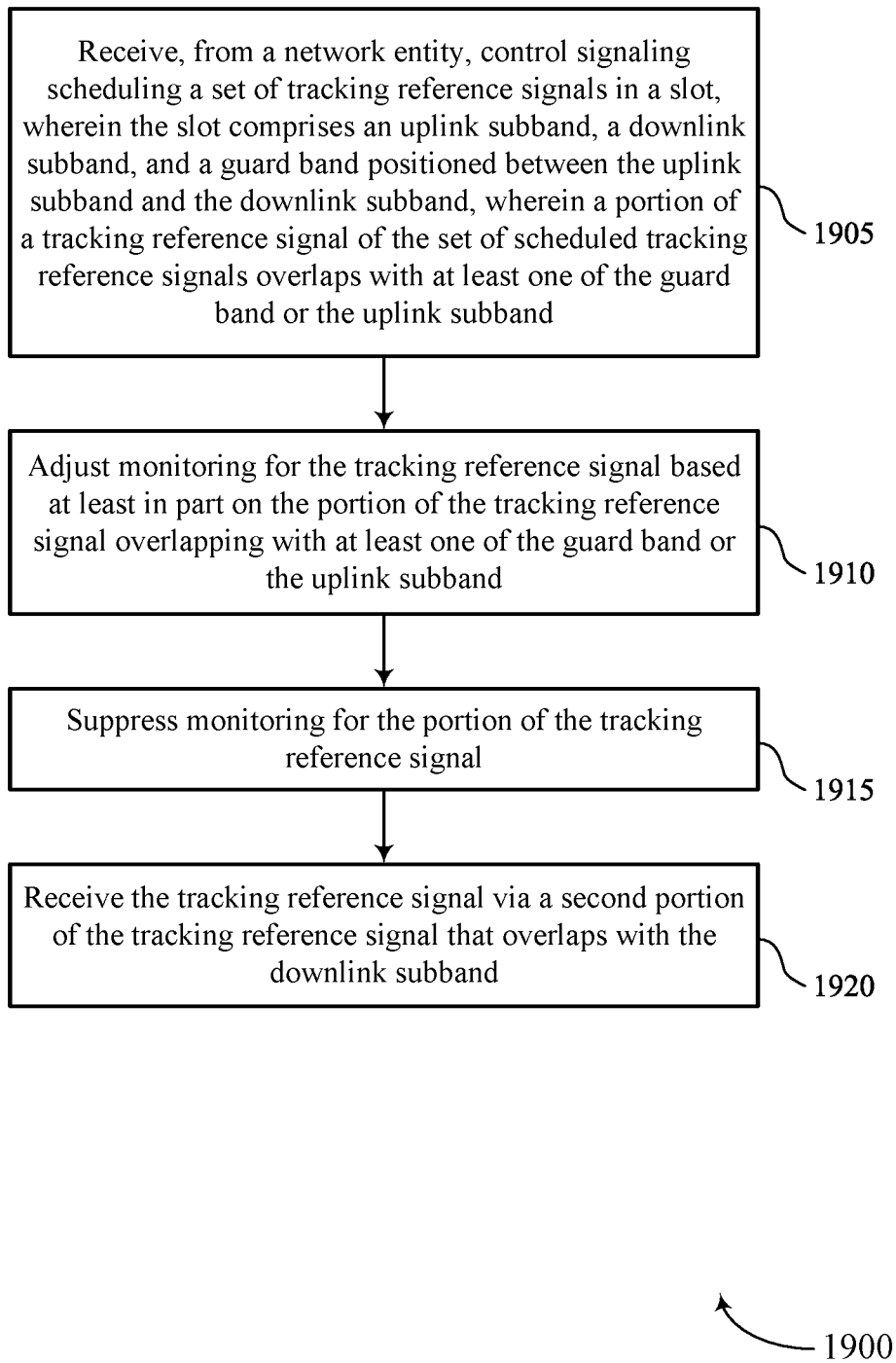

FIG. 19 shows a flowchart illustrating a method 1900 that supports TRSs in full duplex operation in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving, from a network entity, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The operations of 1905 may be performed in accordance with examples as disclosed herein. In some examples, aspects of the operations of 1905 may be performed by a TRS scheduling manager 1225 as described with reference to FIG. 12.

At 1910, the method may include adjusting monitoring for the TRS based on the portion of the TRS overlapping with at least one of the guard band or the uplink subband. The operations of 1910 may be performed in accordance with examples as disclosed herein. In some examples, aspects of the operations of 1910 may be performed by an TRS monitoring adjustment manager 1230 as described with reference to FIG. 12.

At 1915, the method may include suppressing monitoring for the portion of the TRS. The operations of 1915 may be performed in accordance with examples as disclosed herein. In some examples, aspects of the operations of 1915 may be performed by a TRS suppressing manager 1235 as described with reference to FIG. 12.

At 1920, the method may include receiving the TRS via a second portion of the TRS that overlaps with the downlink subband. The operations of 1920 may be performed in accordance with examples as disclosed herein. In some examples, aspects of the operations of 1920 may be performed by a downlink overlap manager 1240 as described with reference to FIG. 12.

Figure 20:
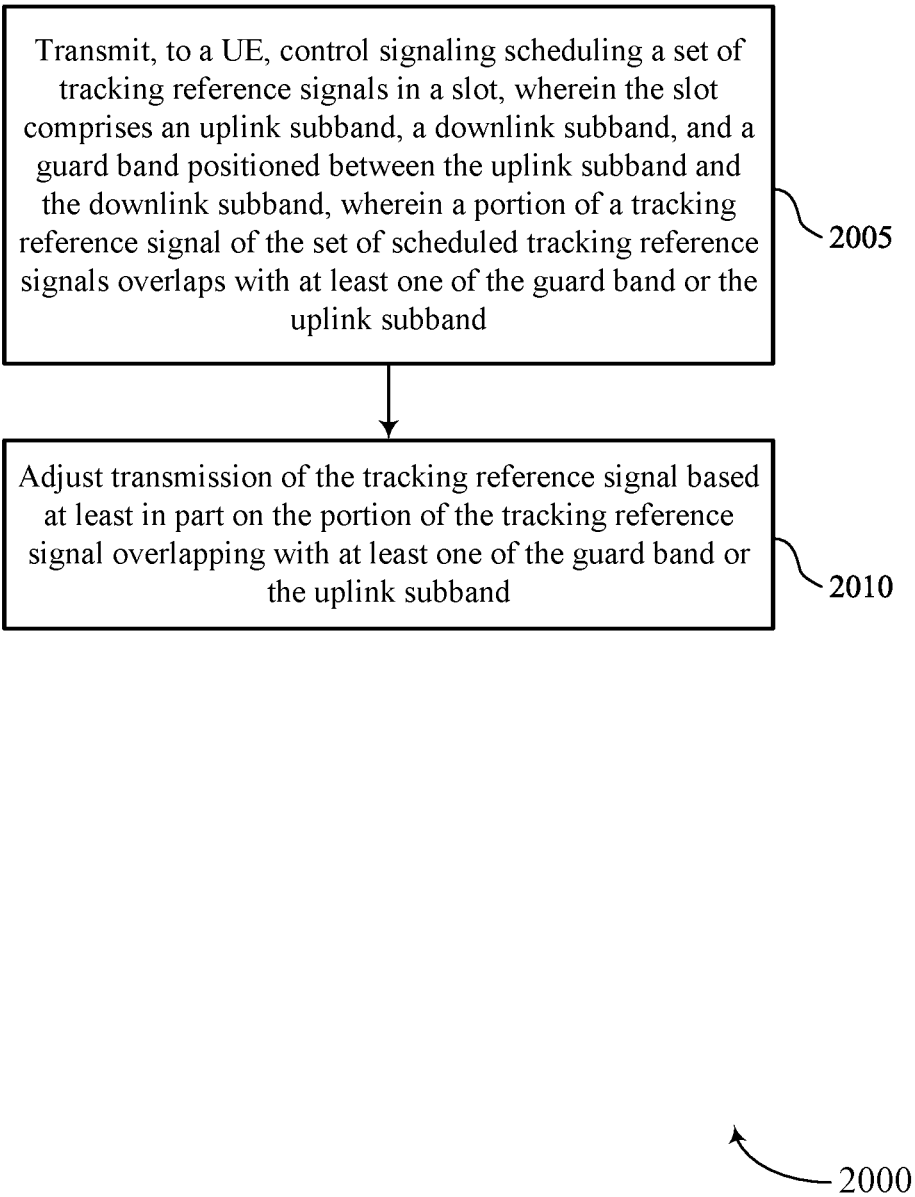

FIG. 20 shows a flowchart illustrating a method 2000 that supports TRSs in full duplex operation in accordance with one or more aspects of the present disclosure. The operations of the method 2000 may be implemented by a network entity or its components as described herein. For example, the operations of the method 2000 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The operations of 2005 may be performed in accordance with examples as disclosed herein. In some examples, aspects of the operations of 2005 may be performed by a TRS scheduling manager 1625 as described with reference to FIG. 16.

At 2010, the method may include adjusting transmission of the TRS based on the portion of the TRS overlapping with at least one of the guard band or the uplink subband. The operations of 2010 may be performed in accordance with examples as disclosed herein. In some examples, aspects of the operations of 2010 may be performed by an TRS transmission adjustment manager 1630 as described with reference to FIG. 16.

Figure 21:
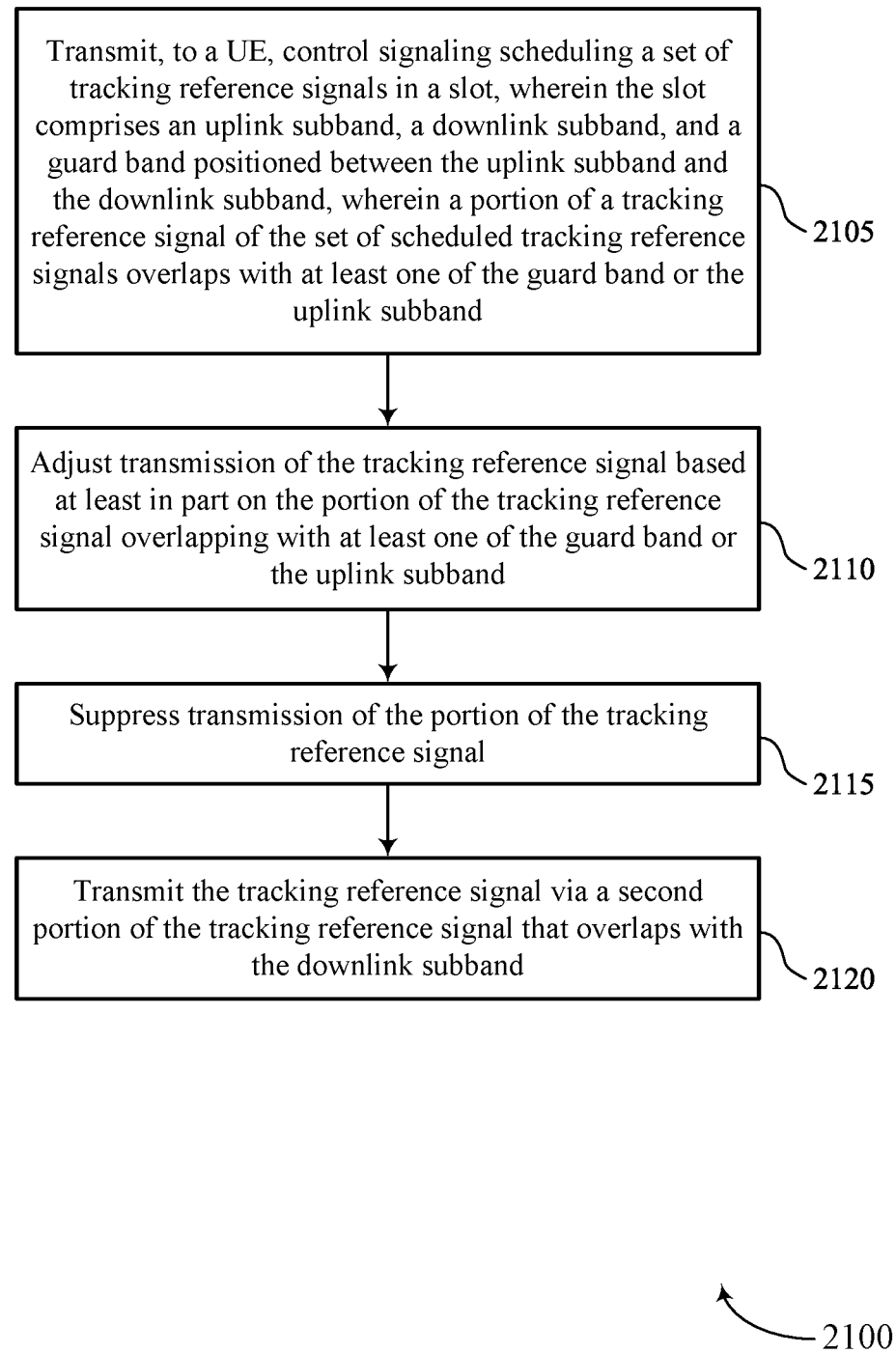

FIG. 21 shows a flowchart illustrating a method 2100 that supports TRSs in full duplex operation in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, to a UE, control signaling scheduling a set of TRSs in a slot, where the slot includes an uplink subband, a downlink subband, and a guard band positioned between the uplink subband and the downlink subband, where a portion of a TRS of the set of scheduled TRSs overlaps with at least one of the guard band or the uplink subband. The operations of 2105 may be performed in accordance with examples as disclosed herein. In some examples, aspects of the operations of 2105 may be performed by a TRS scheduling manager 1625 as described with reference to FIG. 16.

At 2110, the method may include adjusting transmission of the TRS based on the portion of the TRS overlapping with at least one of the guard band or the uplink subband. The operations of 2110 may be performed in accordance with examples as disclosed herein. In some examples, aspects of the operations of 2110 may be performed by an TRS transmission adjustment manager 1630 as described with reference to FIG. 16.

At 2115, the method may include suppressing transmission of the portion of the TRS. The operations of 2115 may be performed in accordance with examples as disclosed herein. In some examples, aspects of the operations of 2115 may be performed by a TRS suppressing manager 1635 as described with reference to FIG. 16.

At 2120, the method may include transmitting the TRS via a second portion of the TRS that overlaps with the downlink subband. The operations of 2120 may be performed in accordance with examples as disclosed herein. In some examples, aspects of the operations of 2120 may be performed by a downlink overlap manager 1640 as described with reference to FIG. 16.

The following provides an overview of aspects of the present disclosure:

Aspect 1: A method for wireless communications at a UE, comprising: receiving, from a network entity, control signaling scheduling a set of TRSs in a slot, wherein the slot comprises an uplink subband, a downlink subband, and a guard band positioned between the uplink subband and the downlink subband, wherein a portion of a TRS of the set of scheduled TRSs overlaps with at least one of the guard band or the uplink subband; and adjusting monitoring for the TRS based at least in part on the portion of the TRS overlapping with at least one of the guard band or the uplink subband.

Aspect 2: The method of aspect 1, further comprising: suppressing monitoring for the TRS based at least in part on the portion of the TRS overlapping with at least one of the guard band or the uplink subband.

Aspect 3: The method of aspect 1, further comprising: suppressing monitoring for the portion of the TRS; and receiving the TRS via a second portion of the TRS that overlaps with the downlink subband.

Aspect 4: The method of aspect 3, wherein receiving the TRS via the second portion comprises: receiving the TRS based at least in part on the second portion satisfying a threshold bandwidth.

Aspect 5: The method of any of aspects 3 through 4, further comprising: receiving the TRS via a third portion of the TRS that overlaps with a second downlink subband of the slot, wherein the second downlink subband is non-contiguous in frequency with the downlink subband.

Aspect 6: The method of aspect 5, wherein receiving the TRS via the second portion and the third portion comprises: receiving the TRS based at least in part on the second portion and the third portion satisfying a cumulative threshold bandwidth.

Aspect 7: The method of aspect 5, wherein receiving the TRS via the second portion and the third portion comprises: receiving the TRS based at least in part on the second portion and the third portion each satisfying a threshold bandwidth.

Aspect 8: The method of any of aspects 3 through 4, further comprising: suppressing monitoring for a third portion of the TRS that overlaps with a second downlink subband of the slot, wherein the second downlink subband is non-contiguous in frequency with the downlink subband.

Aspect 9: The method of aspect 8, wherein suppressing monitoring for the third portion comprises: suppressing monitoring for the third portion based at least in part on the second portion comprising more TRS resources than the third portion.

Aspect 10: The method of any of aspects 8 through 9, wherein suppressing monitoring for the third portion comprises: suppressing monitoring for the third portion based at least in part on the third portion failing to satisfy a threshold bandwidth.

Aspect 11: The method of aspect 1, wherein adjusting monitoring for the TRS comprises: shifting monitored resources for the TRS in frequency such that the monitored resources for the TRS are within the downlink subband.

Aspect 12: The method of any of aspects 1 through 11, further comprising: receiving a second TRS of the scheduled set of TRSs in a half duplex symbol of the slot, wherein the TRS is scheduled in an SBFD symbol of the slot.

Aspect 13: The method of any of aspects 1 through 12, wherein the slot comprises an SBFD slot.

Aspect 14: The method of aspect 13, wherein receiving the control signaling comprises: receiving an indication of a frequency hopping pattern to apply to TRSs in SBFD slots and half duplex slots, wherein adjusting monitoring for the TRS comprises applying the frequency hopping pattern to the TRS such that the TRS is within the downlink subband based at least in part on the slot being an SBFD slot.

Aspect 15: A method for wireless communications at a network entity, comprising: transmitting, to a UE, control signaling scheduling a set of TRSs in a slot, wherein the slot comprises an uplink subband, a downlink subband, and a guard band positioned between the uplink subband and the downlink subband, wherein a portion of a TRS of the set of scheduled TRSs overlaps with at least one of the guard band or the uplink subband; and adjusting transmission of the TRS based at least in part on the portion of the TRS overlapping with at least one of the guard band or the uplink subband.

Aspect 16: The method of aspect 15, further comprising: suppressing transmission of the TRS based at least in part on the portion of the TRS overlapping with at least one of the guard band or the uplink subband.

Aspect 17: The method of aspect 15, further comprising: suppressing transmission of the portion of the TRS; and transmitting the TRS via a second portion of the TRS that overlaps with the downlink subband.

Aspect 18: The method of aspect 17, wherein transmitting the TRS via the second portion comprises: transmitting the TRS based at least in part on the second portion satisfying a threshold bandwidth.

Aspect 19: The method of any of aspects 17 through 18, further comprising: transmitting the TRS via a third portion of the TRS that overlaps with a second downlink subband of the slot, wherein the second downlink subband is non-contiguous in frequency with the downlink subband.

Aspect 20: The method of aspect 19, wherein transmitting the TRS via the second portion and the third portion comprises: transmitting the TRS based at least in part on the second portion and the third portion satisfying a cumulative threshold bandwidth.

Aspect 21: The method of aspect 19, wherein transmitting the TRS via the second portion and the third portion comprises: transmitting the TRS based at least in part on the second portion and the third portion each satisfying a threshold bandwidth.

Aspect 22: The method of any of aspects 17 through 18, further comprising: suppressing transmission of a third portion of the TRS that overlaps with a second downlink subband of the slot, wherein the second downlink subband is non-contiguous in frequency with the downlink subband.

Aspect 23: The method of aspect 22, wherein suppressing transmission of the third portion comprises: suppressing transmission of the third portion based at least in part on the second portion comprising more TRS resources than the third portion.

Aspect 24: The method of any of aspects 22 through 23, wherein suppressing transmission of the third portion comprises: suppressing transmission of the third portion based at least in part on the third portion failing to satisfy a threshold bandwidth.

Aspect 25: The method of aspect 15, wherein adjusting transmission of the TRS comprises: shifting the TRS in frequency such that the TRS is within the downlink subband.

Aspect 26: The method of any of aspects 15 through 25, further comprising: transmitting a second TRS of the scheduled set of TRSs in a half duplex symbol of the slot, wherein the TRS is scheduled in an SBFD symbol of the slot.

Aspect 27: The method of any of aspects 15 through 26, wherein the slot comprises an SBFD slot.

Aspect 28: The method of any of aspects 15 through 27, wherein transmitting the control signaling comprises: transmitting an indication of a frequency hopping pattern to apply to TRSs in SBFD slots and half duplex slots, wherein adjusting transmission of the TRS comprises applying the frequency hopping pattern to the TRS such that the TRS is within the downlink subband based at least in part on the slot being an SBFD slot.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
   suppressing monitoring for the portion of the tracking reference signal; and
   receiving the tracking reference signal, via a second portion of the tracking reference signal that overlaps with the downlink subband, based at least in part on the second portion satisfying a threshold bandwidth.

2. A method for wireless communications at a user equipment (UE), comprising:
receiving, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppressing monitoring for the portion of the tracking reference signal; and
receiving the tracking reference signal via a second portion of the tracking reference signal that overlaps with the downlink subband and via a third portion of the tracking reference signal that overlaps with a second downlink subband of the slot, wherein the second downlink subband is non-contiguous in frequency with the downlink subband, the second portion and the third portion each satisfying a threshold bandwidth or the second portion and the third portion satisfying a cumulative threshold bandwidth.

3. A method for wireless communications at a user equipment (UE), comprising:
receiving, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppressing monitoring for the portion of the tracking reference signal;
receiving the tracking reference signal via a second portion of the tracking reference signal that overlaps with the downlink subband; and
suppressing monitoring for a third portion of the tracking reference signal that overlaps with a second downlink subband of the slot, wherein the second downlink subband is non-contiguous in frequency with the downlink subband.

4. The method of claim 3, wherein suppressing monitoring for the third portion comprises:
suppressing monitoring for the third portion based at least in part on the second portion comprising more tracking reference signal resources than the third portion.

5. The method of claim 3, wherein suppressing monitoring for the third portion comprises:
suppressing monitoring for the third portion based at least in part on the third portion failing to satisfy a threshold bandwidth.

6. The method of claim 1, further comprising:
receiving a second tracking reference signal of the set of scheduled tracking reference signals in a half duplex symbol of the slot, wherein the tracking reference signal is scheduled in a subband full duplex symbol of the slot.

7. The method of claim 1, wherein the slot comprises a subband full duplex slot.

8. The method of claim 7, wherein receiving the control signaling comprises:
receiving an indication of a frequency hopping pattern to apply to tracking reference signals in subband full duplex slots and half duplex slots, wherein adjusting monitoring for the tracking reference signal comprises applying the frequency hopping pattern to the tracking reference signal such that the tracking reference signal is within the downlink subband based at least in part on the slot being a subband full duplex slot.

9. A method for wireless communications at a network entity, comprising:
transmitting, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppressing transmission for the portion of the tracking reference signal; and
transmitting the tracking reference signal, via a second portion of the tracking reference signal that overlaps with the downlink subband, based at least in part on the second portion satisfying a threshold bandwidth.

10. A method for wireless communications at a network entity, comprising:
transmitting, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppressing transmission for the portion of the tracking reference signal; and
transmitting the tracking reference signal via a second portion of the tracking reference signal that overlaps with the downlink subband and via a third portion of the tracking reference signal that overlaps with a second downlink subband of the slot, wherein the second downlink subband is non-contiguous in frequency with the downlink subband, the second portion and the third portion each satisfying a threshold bandwidth or the second portion and the third portion satisfying a cumulative threshold bandwidth.

11. A method for wireless communications at a network entity, comprising:
transmitting, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppressing transmission for the portion of the tracking reference signal;
transmitting the tracking reference signal via a second portion of the tracking reference signal that overlaps with the downlink subband; and
suppressing transmission of a third portion of the tracking reference signal that overlaps with a second downlink subband of the slot, wherein the second downlink subband is non-contiguous in frequency with the downlink subband.

12. The method of claim 11, wherein suppressing transmission of the third portion comprises:
suppressing transmission of the third portion based at least in part on the second portion comprising more tracking reference signal resources than the third portion.

13. The method of claim 11, wherein suppressing transmission of the third portion comprises:
suppressing transmission of the third portion based at least in part on the third portion failing to satisfy a threshold bandwidth.

14. The method of claim 9, further comprising:
transmitting a second tracking reference signal of the set of scheduled tracking reference signals in a half duplex symbol of the slot, wherein the tracking reference signal is scheduled in a subband full duplex symbol of the slot.

15. The method of claim 9, wherein the slot comprises a subband full duplex slot.

16. The method of claim 9, wherein transmitting the control signaling comprises:
transmitting an indication of a frequency hopping pattern to apply to tracking reference signals in subband full duplex slots and half duplex slots, wherein adjusting transmission of the tracking reference signal comprises applying the frequency hopping pattern to the tracking reference signal such that the tracking reference signal is within the downlink subband based at least in part on the slot being a subband full duplex slot.

17. An apparatus for wireless communications at a user equipment (UE), comprising:
a processor;
memory coupled with the processor; and
instructions stored in the memory and executable by the processor to cause the apparatus to:
receive, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppress monitoring for the portion of the tracking reference signal; and
receive the tracking reference signal, via a second portion of the tracking reference signal that overlaps with the downlink subband, based at least in part on the second portion satisfying a threshold bandwidth.

18. An apparatus for wireless communications at a network entity, comprising:
a processor;
memory coupled with the processor; and
instructions stored in the memory and executable by the processor to cause the apparatus to:
transmit, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppress transmission for the portion of the tracking reference signal; and
transmit the tracking reference signal, via a second portion of the tracking reference signal that overlaps with the downlink subband, based at least in part on the second portion satisfying a threshold bandwidth.

19. An apparatus for wireless communications at a user equipment (UE), comprising:
a processor;
memory coupled with the processor; and
instructions stored in the memory and executable by the processor to cause the apparatus to:
receive, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppress monitoring for the portion of the tracking reference signal; and
receive the tracking reference signal via a second portion of the tracking reference signal that overlaps with the downlink subband and via a third portion of the tracking reference signal that overlaps with a second downlink subband of the slot, wherein the second downlink subband is non-contiguous in frequency with the downlink subband, the second portion and the third portion each satisfying a threshold bandwidth or the second portion and the third portion satisfying a cumulative threshold bandwidth.

20. An apparatus for wireless communications at a user equipment (UE), comprising:
a processor;
memory coupled with the processor; and
instructions stored in the memory and executable by the processor to cause the apparatus to:
receive, from a network entity, control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;
suppress monitoring for the portion of the tracking reference signal;
receive the tracking reference signal via a second portion of the tracking reference signal that overlaps with the downlink subband; and
suppress monitoring for a third portion of the tracking reference signal that overlaps with a second downlink subband of the slot, wherein the second downlink subband is non-contiguous in frequency with the downlink subband.

21. An apparatus for wireless communications at a network entity, comprising:
a processor;
memory coupled with the processor; and
instructions stored in the memory and executable by the processor to cause the apparatus to:
transmit, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;

suppress transmission for the portion of the tracking reference signal; and transmit the tracking reference signal via a second portion of the tracking reference signal that overlaps with the downlink subband and via a third portion of the tracking reference signal that overlaps with a second downlink subband of the slot, wherein the second downlink subband is non-contiguous in frequency with the downlink subband, the second portion and the third portion each satisfying a threshold bandwidth or the second portion and the third portion satisfying a cumulative threshold bandwidth.

22. An apparatus for wireless communications at a network entity, comprising:

a processor;

memory coupled with the processor; and instructions stored in the memory and executable by the processor to cause the apparatus to:

transmit, to a user equipment (UE), control signaling scheduling a set of tracking reference signals in a slot, wherein the slot comprises an uplink subband, a downlink subband, and a guard band positioned between the uplink subband and the downlink subband, wherein a portion of a tracking reference signal of the set of scheduled tracking reference signals overlaps with at least one of the guard band or the uplink subband;

suppress transmission for the portion of the tracking reference signal;

transmit the tracking reference signal via a second portion of the tracking reference signal that overlaps with the downlink subband; and suppress transmission of a third portion of the tracking reference signal that overlaps with a second downlink subband of the slot, wherein the second downlink subband is non-contiguous in frequency with the downlink subband.

* * * * *